(12) United States Patent
Toyoda

(10) Patent No.: US 8,054,549 B2
(45) Date of Patent: Nov. 8, 2011

(54) ZOOM LENS AND IMAGE PICKUP APPARATUS

(75) Inventor: Koji Toyoda, Kanagawa (JP)

(73) Assignee: Sony Corporation, Tokyo (JP)

(*) Notice: Subject to any disclaimer, the term of this patent is extended or adjusted under 35 U.S.C. 154(b) by 28 days.

(21) Appl. No.: 12/654,804

(22) Filed: Jan. 5, 2010

(65) Prior Publication Data

US 2010/0202053 A1  Aug. 12, 2010

(30) Foreign Application Priority Data

Feb. 10, 2009  (JP) ................. 2009-028517

(51) Int. Cl.
*G02B 27/64* (2006.01)
*G02B 15/14* (2006.01)
(52) U.S. Cl. ................... 359/557; 359/554; 359/676
(58) Field of Classification Search .......... 359/554–557, 359/676–690
See application file for complete search history.

(56) References Cited

U.S. PATENT DOCUMENTS

| 2008/0212184 A1* | 9/2008 | Ohtake | 359/557 |
| 2009/0168179 A1* | 7/2009 | Toyoda | 359/557 |

FOREIGN PATENT DOCUMENTS

| JP | 07-261080 A | 10/1995 |
| JP | 09-090221 A | 4/1997 |
| JP | 2003-228001 A | 8/2003 |
| JP | 2005-055625 A | 3/2005 |
| JP | 2006-023593 | 1/2006 |
| JP | 2006-113257 A | 4/2006 |
| JP | 2007-108343 A | 4/2007 |
| JP | 2008-164725 A | 7/2008 |

* cited by examiner

*Primary Examiner* — Thong Nguyen
(74) *Attorney, Agent, or Firm* — Rader, Fishman & Grauer PLLC

(57) ABSTRACT

A zoom lens includes, in order from an object side to an image side, a positive refractive, fixed first lens unit; a negative refractive second lens unit movable mainly for zooming; a positive refractive, fixed third lens unit; a positive refractive fourth lens unit movable for focal-position correction and focusing performed in response to zooming; and a positive refractive fifth lens unit. The fifth lens unit includes, in order from the object side to the image side, a negative refractive, fixed sub-unit; and a positive refractive sub-unit movable substantially perpendicularly to an optical axis. An image formed on an image surface is movable substantially perpendicularly to the optical axis by moving the movable sub-unit substantially perpendicularly to the optical axis. An aperture stop is provided on the object side of the third lens unit. The third lens unit includes a positive refractive sub-unit and a negative refractive sub-unit.

6 Claims, 13 Drawing Sheets

ZOOM LENS AND IMAGE PICKUP APPARATUS

BACKGROUND OF THE INVENTION

1. Field of the Invention

The present invention relates to zoom lenses and image pickup apparatuses, and more specifically to a technical field of a zoom lens and an image pickup apparatus having an optical image stabilization function and a small-sized lens configuration with high image quality and high-magnification.

2. Description of the Related Art

In recent years, small-sized image pickup apparatuses such as video cameras and digital video cameras have been common for home use. Such small-sized image pickup apparatuses are particularly desired to be small, taking portability into consideration, and to have high image quality and high magnifications.

To realize size reduction and increase in image quality and magnification of such image pickup apparatuses, it is important to reduce the overall lengths or depths of image-taking lenses, particularly, zoom lenses, to be included in the image pickup apparatuses and to improve the performance of such lenses.

Besides, there has recently been an increasing demand for the optical image stabilization function. To satisfy the demand for the optical image stabilization function as well as the demands for reduced size and increased image quality and magnification, the degree of designing difficulty has become very high.

Under such circumstances, Japanese Unexamined Patent Application Publication No. 2003-228001 discloses an exemplary zoom lens including, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power.

In the zoom lens disclosed in Japanese Unexamined Patent Application Publication No. 2003-228001, the third lens unit includes a lens element having a positive refractive power and a lens element having a negative refractive power. To correct image blurring due to camera shake, the third lens unit is moved in a direction substantially perpendicular to an optical axis.

Thus, according to Japanese Unexamined Patent Application Publication No. 2003-228001, a zoom lens intended for video cameras capable of optical image stabilization is realized.

Another exemplary zoom lens is disclosed in Japanese Unexamined Patent Application Publication No. 2006-23593. The zoom lens includes, in order from an object side to an image side, a first lens unit having a positive refractive power, a second lens unit having a negative refractive power, a third lens unit having a positive refractive power, a fourth lens unit having a positive refractive power, and a fifth lens unit having a positive refractive power.

In the zoom lens disclosed in Japanese Unexamined Patent Application Publication No. 2006-23593, the fifth lens unit includes, in order from the object side to the image side, a positive sub-unit having a positive refractive power and a negative sub-unit having a negative refractive power. To correct image blurring due to camera shake, the positive sub-unit is moved in a direction substantially perpendicular to an optical axis.

Thus, according to Japanese Unexamined Patent Application Publication No. 2006-23593, a zoom lens intended for video cameras capable of optical image stabilization is realized.

In each of the foregoing related-art zoom lenses, a specific lens unit is moved in a direction substantially perpendicular to the optical axis so as to mainly correct image blurring at and near a telephoto end due to camera shake, whereby good imaging and optical performance is realized. The configuration of such a zoom lens is determined such that the above-mentioned image stabilization function and desired optical performance are realized with a reduced size, increased magnification, and so forth.

The zoom lenses disclosed in Japanese Unexamined Patent Application Publications No. 2003-228001 and No. 2006-23593 each include five lens units, thereby realizing high magnification, high image quality, the optical image stabilization function, and good optical performance.

With the introduction of the optical image stabilization function, however, some problems described below have arisen in the related-art zoom lenses disclosed in Japanese Unexamined Patent Application Publications No. 2003-228001 and No. 2006-23593.

Specifically, with the introduction of the optical image stabilization function, the overall sizes of apparatuses including the zoom lenses are increased with image stabilization mechanisms, which is contrary to the idea of reducing the overall sizes of lens barrels, including relevant mechanical components.

Examples of the problems are as follows. In the zoom lens disclosed in Japanese Unexamined Patent Application Publication No. 2003-228001, the third lens unit is moved in a direction substantially perpendicular to the optical axis so as to correct image blurring due to camera shake. In general, a light beam entering the third lens unit tends to have a large diameter, compared with when entering the other lens units excluding the first lens unit. Taking into consideration the movement for image stabilization, the effective diameter of the third lens unit on the surface thereof becomes very large. Consequently, the size of an apparatus including the zoom lens is increased.

In addition, the third lens unit is provided at substantially a central position of the entire lens system in the optical-axis direction and has a strong refractive power. Therefore, when the third lens unit is moved in a direction substantially perpendicular to the optical axis, the position of the light beam on other lens units significantly changes, and the effective diameters of those lens units on the respective surfaces thereof increases. Consequently, the overall size of an apparatus including the zoom lens is increased.

In the zoom lens disclosed in Japanese Unexamined Patent Application Publication No. 2006-23593, the fifth lens unit includes, in order from the object side to the image side, the positive sub-unit and the negative sub-unit so as to correct image blurring due to camera shake, and the positive sub-unit, which is positioned on the object side, is moved in a direction substantially perpendicular to the optical axis. Therefore, spaces for providing image stabilization mechanisms are to be provided on both sides of the positive sub-unit with respect to the optical axis. Consequently, the overall size of an apparatus including the zoom lens is increased.

Moreover, providing the spaces for image stabilization mechanisms on both sides of the positive sub-unit with respect to the optical axis imposes severer restrictions on the optical design. This may deteriorate image quality.

As described above, the zoom lenses disclosed in Japanese Unexamined Patent Application Publications No. 2003-

228001 and No. 2006-23593 are disadvantageous in that the overall sizes of apparatuses including the zoom lenses are increased because of the positions of the lens units responsible for optical image stabilization.

The increase in the overall sizes of apparatuses is remarkable in cases where magnification and image quality desired to be realized are high. This severely prevents the realization of a small-sized, high-magnification zoom lens having the optical image stabilization function.

SUMMARY OF THE INVENTION

It is desirable that the present invention provide a zoom lens and an image pickup apparatus that have overcome the problems described above and each realize a lens configuration having an optical image stabilization function with a small body, high image quality, and high magnification.

To solve the problems described above, a zoom lens according to a first embodiment of the present invention includes, in order from an object side to an image side, a first lens unit having a positive refractive power and whose position is fixed, a second lens unit having a negative refractive power and being movable mainly for zooming, a third lens unit having a positive refractive power and whose position is fixed, a fourth lens unit having a positive refractive power and being movable for correction of a focal position and for focusing performed in response to zooming, and a fifth lens unit having a positive refractive power. The fifth lens unit includes, in order from the object side to the image side, a fixed sub-unit having a negative refractive power and whose position is fixed, and a movable sub-unit having a positive refractive power and being movable in a direction substantially perpendicular to an optical axis. An image formed on an image surface is movable in a direction substantially perpendicular to the optical axis by moving the movable sub-unit of the fifth lens unit in the direction substantially perpendicular to the optical axis. An aperture stop is provided on the object side of the third lens unit. The third lens unit includes a positive sub-unit having a positive refractive power and a negative sub-unit having a negative refractive power.

In the zoom lens according to the first embodiment, the fifth lens unit includes two sub-units, and one of all the lens units nearest to an image-side end, i.e., the movable sub-nit, is movable in a direction substantially perpendicular to the optical axis.

Thus, a small-sized zoom lens having an optical image stabilization function is provided with high image quality and high magnification.

In the zoom lens according to the first embodiment, it is desirable that the third lens unit satisfy the following conditional expressions:

$0.4<|f31/f32|<0.6$ $0.3<fw/f31<0.5$ where f31 denotes a focal length of the positive sub-unit included in the third lens unit, f32 denotes a focal length of the negative sub-unit included in the third lens unit, and fw denotes an overall focal length of the zoom lens at a wide-angle end.

Since the zoom lens satisfies the above conditional expressions, the refractive powers of the positive sub-unit and the negative sub-unit included in the third lens unit are optimized.

Thus, the occurrence of coma and field curvature is suppressed, and good resolution is realized, whereby image quality is improved.

In the zoom lens according to the first embodiment, it is desirable that the negative sub-unit of the third lens unit include a positive refractive lens element and a negative refractive lens element that are cemented together.

Since the negative sub-unit includes the positive refractive lens element and the negative refractive lens element that are cemented together, longitudinal chromatic aberration at and near a wide-angle end is corrected well.

Thus, high-contrast resolution is realized.

In the zoom lens according to the first embodiment, it is desirable that the negative sub-unit of the third lens unit satisfy the following conditional expressions:

$0.3<|f32f/f32s|<0.6$ $0.6<f3/f32s<0.8$ where f32f denotes a focal length of the negative refractive lens element included in the negative sub-unit of the third lens unit, f32s denotes a focal length of the positive refractive lens element included in the negative sub-unit of the third lens unit, and f3 denotes a focal length of the third lens unit.

Since the zoom lens satisfies the above conditional expressions, the refractive powers of the negative refractive lens element and the positive refractive lens element are optimized.

Thus, the occurrence of longitudinal chromatic aberration, field curvature, and coma is suppressed, and good resolution is realized, whereby image quality is improved.

To solve the problems described above, an image pickup apparatus according to a second embodiment of the present invention includes a zoom lens and an image pickup device converting an optical image formed by the zoom lens into an electrical signal. The zoom lens includes, in order from an object side to an image side, a first lens unit having a positive refractive power and whose position is fixed, a second lens unit having a negative refractive power and being movable mainly for zooming, a third lens unit having a positive refractive power and whose position is fixed, a fourth lens unit having a positive refractive power and being movable for correction of a focal position and for focusing performed in response to zooming, and a fifth lens unit having a positive refractive power. The fifth lens unit includes, in order from the object side to the image side, a fixed sub-unit having a negative refractive power and whose position is fixed, and a movable sub-unit having a positive refractive power and being movable in a direction substantially perpendicular to an optical axis. An image formed on an image surface is movable in a direction substantially perpendicular to the optical axis by moving the movable sub-unit of the fifth lens unit in the direction substantially perpendicular to the optical axis. An aperture stop is provided on the object side of the third lens unit. The third lens unit includes a positive sub-unit having a positive refractive power and a negative sub-unit having a negative refractive power.

In the image pickup apparatus according to the second embodiment, the third lens unit includes two sub-units, and one of all the lens units nearest to an image-side end, i.e., the movable sub-unit, is movable in a direction substantially perpendicular to the optical axis.

Thus, a small-sized image pickup apparatus having an optical image stabilization function is provided with high image quality and high magnification.

DESCRIPTION OF THE PREFERRED EMBODIMENTS

Figure 1:
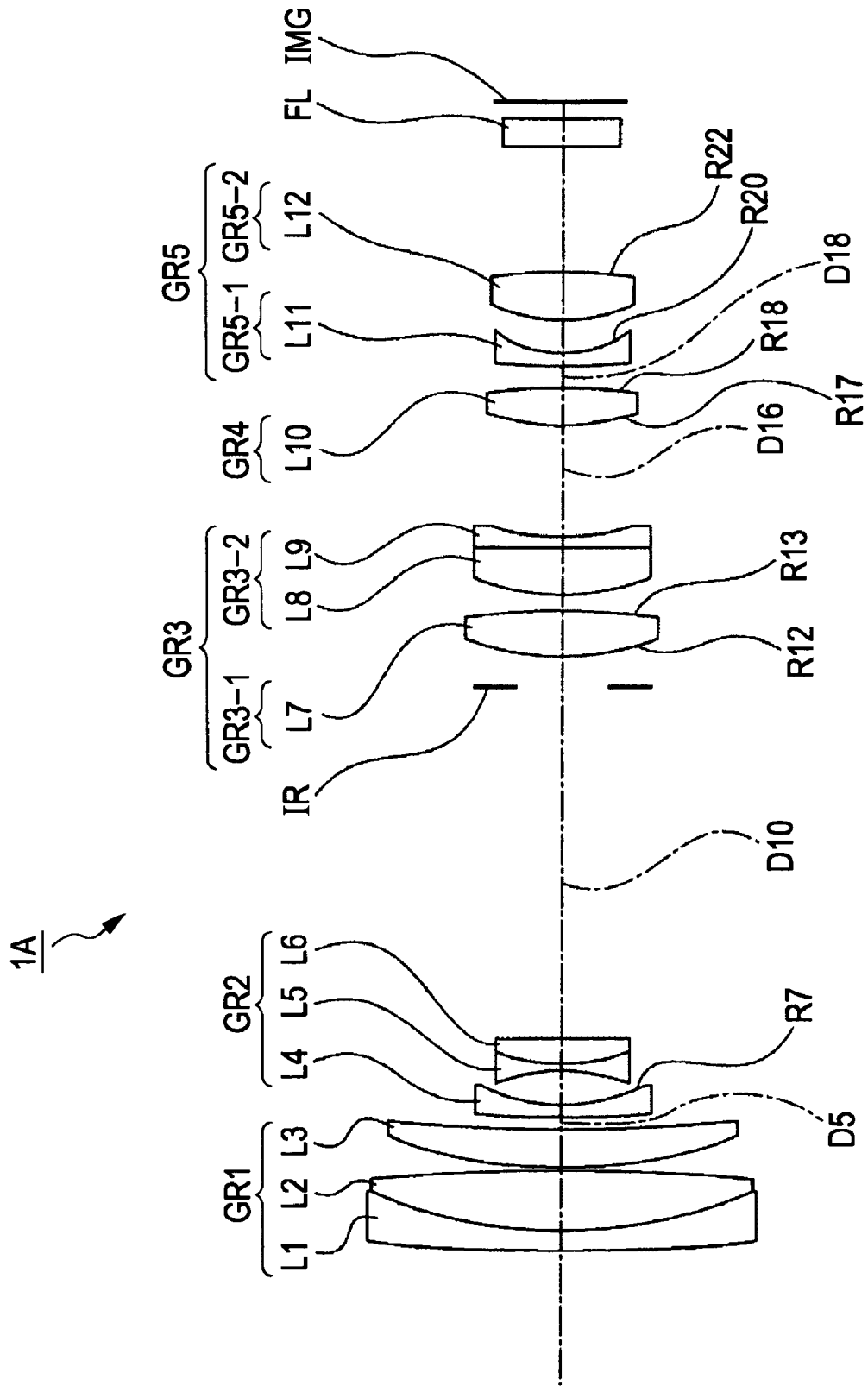
FIG. 1 concerns, together with FIGS. 2 to 13, a zoom lens and an image pickup apparatus according to general embodiments of the present invention, and specifically shows the configuration of a zoom lens according to a first exemplary embodiment of the present invention.

Embodiments of the present invention will now be described.

Configuration of Zoom Lens

A zoom lens according to a general embodiment of the present invention will first be described.

The zoom lens according to the general embodiment of the present invention includes, in order from an object side to an image side, a first lens unit having a positive refractive power, a second lens unit having a negative refractive power, a third lens unit having a positive refractive power, a fourth lens unit having a positive refractive power, and a fifth lens unit having a positive refractive power.

The first lens unit is fixed at a specific position. The second lens unit is movable mainly for zooming. The third lens unit is fixed at a specific position. The fourth lens unit is movable for correction of the focal position and focusing performed in response to zooming.

The fifth lens unit includes, in order from the object side to the image side, a fixed sub-unit having a negative refractive power and fixed at a specific position and a movable sub-unit having a positive refractive power and being movable in a direction substantially perpendicular to an optical axis.

The zoom lens according to the general embodiment of the present invention is capable of moving an image formed on an image surface in a direction substantially perpendicular to the optical axis by moving the movable sub-unit of the fifth lens unit in the same direction.

As described above, in the zoom lens according to the general embodiment of the present invention, the fifth lens unit includes the fixed sub-unit and the movable sub-unit, and an image formed on the image surface is movable in a direction substantially perpendicular to the optical axis by moving the movable sub-unit, provided at the position nearest to an image-side end among all the lens units, in the same direction. Thus, image blurring due to camera shake or the like is corrected by the movement of the movable sub-unit of the fifth lens unit in a direction substantially perpendicular to the optical axis.

The effective diameter of a light beam passing through the lens unit nearest to the image-side end is relatively small. Since the sub-unit nearest to the image-side end is movable for the correction of image blurring, the size of a lens barrel housing the zoom lens is reduced.

Moreover, since the movable sub-unit is provided at the position nearest to the image-side end, changes in the positions where the light beam passes through the other lens units occurring at the time of correction of image blurring are small. Consequently, the size of the lens barrel is further reduced.

Besides, since the movable sub-unit is provided at the position nearest to the image-side end, restrictions of providing spaces on both sides of the movable sub-unit with respect to the optical axis are loosened. Consequently, optical performance is improved, and the size of the lens barrel is reduced.

In the zoom lens according to the general embodiment of the present invention, an aperture stop is provided on the object side of the third lens unit, and the third lens unit includes a positive sub-unit having a positive refractive power and a negative sub-unit having a negative refractive power.

Since the aperture stop is positioned on the object side of the third lens unit and the third lens unit includes the foregoing two sub-units, the total optical-axis-direction length of the third and subsequent lens units, which are provided on the image side with respect to the aperture stop and tend to become large in a configuration including five lens units, is reduced. Consequently, the overall size of the zoom lens is reduced.

In addition, since the third lens unit includes the positive sub-unit and the negative sub-unit, aberration components, particularly, chromatic aberration at and near a wide-angle end, that are difficult to correct only with the fifth lens unit is corrected well.

With the configuration described above, a small-sized zoom lens having an optical image stabilization function is provided with high image quality and high magnification.

It is desirable that the zoom lens according to the general embodiment of the present invention satisfy Conditional Expressions (1) and (2) below:

$$0.4 < |f31/f32| < 0.6 \quad (1)$$

$$0.3 < fw/f31 < 0.5 \quad (2)$$

where f31 denotes the focal length of the positive sub-unit included in the third lens unit, f32 denotes the focal length of the negative sub-unit included in the third lens unit, and fw denotes the overall focal length of the zoom lens at the wide-angle end.

Conditional Expression (1) defines an appropriate focal length ratio, i.e., the refractive power ratio, between the positive sub-unit having a positive refractive power and the negative sub-unit having a negative refractive power in the third lens unit.

If the upper limit of Conditional Expression (1) is exceeded, the refractive power of the negative sub-unit included in the third lens unit becomes too strong. Particularly, the overall length of the third and subsequent lens units, provided on the image side with respect to the aperture stop, becomes long. Consequently, the size of the lens barrel is increased. Moreover, the heights of incidence of a light beam on the lens surfaces of the negative sub-unit and the subsequent lens units, which are provided on the image side with respect to the positive sub-unit of the third lens unit, become large. Consequently, the resolution is significantly reduced with increased aberrations, in particular, coma.

In contrast, if the lower limit of Conditional Expression (1) is exceeded, the refractive power of the positive sub-unit included in the third lens unit becomes too strong. This increases the light-converging effect of the third lens unit. Consequently, it becomes difficult to provide spaces for an image stabilization function within a range from the movable sub-unit of the fifth lens unit to an image-side end. Moreover, the resolution is significantly reduced with increased aberrations, in particular, coma, occurring in the positive sub-unit of the third lens unit.

Therefore, if the zoom lens satisfies Conditional Expression (1), the increase in aberrations, including coma, is suppressed, and good resolution is realized, whereby image quality is improved.

Conditional Expression (2) defines an appropriate focal length ratio, i.e., refractive power ratio, between the zoom lens itself at the wide-angle end and the positive sub-unit of the third lens unit.

If the upper limit of Conditional Expression (2) is exceeded, the refractive power of the positive sub-unit of the third lens unit becomes too strong. Consequently, optical performance is significantly deteriorated in the entire zoom range. Specifically, overcorrection occurs in the entire zoom range, causing field curvature on the under side and increased coma. Consequently, the resolution is reduced.

In contrast, if the lower limit of Conditional Expression (2) is exceeded, the refractive power of the positive sub-unit of the third lens unit becomes too weak. Consequently, optical performance is significantly deteriorated in the entire zoom range. Specifically, undercorrection occurs in the entire zoom range, causing field curvature on the over side and increased coma. Consequently, the resolution is reduced.

Therefore, if the zoom lens satisfies Conditional Expression (2), the occurrence of field curvature and coma is suppressed, and good resolution is realized, whereby image quality is improved.

It is desirable that the negative sub-unit included in the third lens unit of the zoom lens according to the general embodiment of the present invention include a lens element having a positive refractive power (hereinafter referred to as positive refractive lens element) and a lens element having a negative refractive power (hereinafter referred to as negative refractive lens element) that are cemented together.

With the negative sub-unit of the third lens unit including the positive refractive lens element and the negative refractive lens element that are cemented together, longitudinal chromatic aberration at and near the wide-angle end is particularly corrected well. Consequently, high-contrast resolution is realized.

It is desirable that the negative sub-unit included in the third lens unit of the zoom lens according to the general embodiment of the present invention satisfy Conditional Expressions (3) and (4) below:

$$0.3 < |f32f/f32s| < 0.6 \quad (3)$$

$$0.6 < f3/f32s < 0.8 \quad (4)$$

where $f32f$ denotes the focal length of the negative refractive lens element included in the negative sub-unit of the third lens unit, $f32s$ denotes the focal length of the positive refractive lens element included in the negative sub-unit of the third lens unit, and $f3$ denotes the focal length of the third lens unit.

Conditional Expression (3) defines an appropriate focal length ratio, i.e., refractive power ratio, between the positive and negative refractive lens elements included in the negative sub-unit of the third lens unit.

If the upper limit of Conditional Expression (3) is exceeded, the refractive power of the positive refractive lens element becomes too strong. Consequently, optical performance particularly at and near the wide-angle end is significantly deteriorated. Specifically, longitudinal chromatic aberration at and near the wide-angle end increases. Consequently, the resolution is reduced.

In contrast, if the lower limit of Conditional Expression (3) is exceeded, the refractive power of the positive refractive lens element becomes too weak. Consequently, optical performance particularly at and near the wide-angle end is significantly deteriorated. Specifically, the balance of correction of longitudinal chromatic aberration at and near the wide-angle end is disturbed. Consequently, the resolution is reduced.

Therefore, if the zoom lens satisfies Conditional Expression (3), longitudinal chromatic aberration is corrected well, and good resolution is realized, whereby image quality is improved.

Conditional Expression (4) defines an appropriate focal length ratio, i.e., refractive power ratio, between the third lens unit and the positive refractive lens element included in the negative sub-unit of the third lens unit.

If the upper limit of Conditional Expression (4) is exceeded, the refractive power of the positive refractive lens element becomes too strong. Consequently, optical performance is significantly deteriorated in the entire zoom range. Particularly, longitudinal chromatic aberration increases at and near the wide-angle end. Furthermore, field curvature occurs on the under side and coma increases in the entire zoom range because of overcorrection. Consequently, the resolution is reduced.

In contrast, if the lower limit of Conditional Expression (4) is exceeded, the refractive power of the positive refractive lens element becomes too weak. Consequently, optical performance is significantly deteriorated in the entire zoom range. Particularly, longitudinal chromatic aberration increases at and near the wide-angle end. Furthermore, field curvature occurs on the over side and coma increases in the entire zoom range because of undercorrection. Consequently, the resolution is reduced.

Therefore, if the zoom lens satisfies Conditional Expression (4), the occurrence of longitudinal chromatic aberration, field curvature, and coma is suppressed, and good resolution is realized, whereby image quality is improved.

Exemplary Embodiments

Exemplary embodiments of the zoom lens according to the general embodiment of the present invention and numerical examples provided by applying specific values to the exemplary embodiments will now be described with reference to the accompanying drawings and tables.

Denotations used in the tables and description provided below are as follows.

"Ri" denotes the radius of curvature of the i-th surface counted from the object side, "Di" denotes the surface distance between the i-th surface and the (i+1)-th surface along the optical axis, "Ni" denotes the refractive index of the material composing the lens element having the i-th surface with respect to the d-line (wavelength of 587.6 nm), "vi" denotes the Abbe number of the material composing the lens element having the i-th surface with respect to the d-line (wavelength of 587.6 nm). Regarding the radius of curvature, "ASP" denotes that the surface of interest is aspherical. Regarding the surface distance along the optical axis, "variable" denotes that the distance is variable. In addition, "Fno" denotes the f-number, and "ω" denotes the half angle of view.

Zoom lenses corresponding to respective numerical examples each include several lens elements having aspherical surfaces. The shape of each aspherical surface is expressed as follows:

$$Xi=(Ci\cdot Y^2)/\{1+(1-Ci^2\cdot Y^2)^{1/2}\}+A4\cdot Y^4+A6\cdot Y^6+A8\cdot Y^8+A10\cdot Y^{10}$$

where "Xi" denotes the optical-axis-direction coordinates of the i-th surface that is aspherical, "Ci" denotes the paraxial curvature (the reciprocal of radius of curvature) of the i-th surface, "Y" denotes the distance from the optical axis, and "A4", "A6", "A8", and "A10" denote aspherical coefficients of fourth, sixth, eighth, and tenth orders, respectively.

Zoom lenses 1A, 1B, and 1C according to first to third exemplary embodiments described below each include, in order from an object side to an image side, a first lens unit GR1 having a positive refractive power, a second lens unit GR2 having a negative refractive power, a third lens unit GR3 having a positive refractive power, a fourth lens unit GR4 having a positive refractive power, and a fifth lens unit GR5 having a positive refractive power.

The first lens unit GR1 is fixed to a specific position. The second lens unit GR2 is movable mainly for zooming. The third lens unit GR3 is fixed to a specific position. The fourth lens unit GR4 is movable for correction of the focal position and focusing performed in response to zooming.

The second lens unit GR2, the third lens unit GR3, the fourth lens unit GR4, and the fifth lens unit GR5 each have at least one aspherical surface.

First Exemplary Embodiment

FIG. 1 shows the configuration of the zoom lens 1A according to the first exemplary embodiment of the present invention. The zoom lens 1A includes twelve lens elements.

The first lens unit GR1 has a positive refractive power and includes three lens elements L1, L2, and L3 arranged in that order from the object side to the image side.

The lens element L1 has a convex object-side surface and a concave image-side surface. The lens element L2 is a biconvex lens element. The lens elements L1 and L2 together form a cemented lens in which the concave and convex surfaces thereof having the same radius of curvature are cemented together and form a cemented surface R2. The lens element L3 is a meniscus lens element with a concave surface thereof facing the image side.

The second lens unit GR2 has a negative refractive power and includes three lens elements L4, L5, and L6 arranged in that order from the object side to the image side.

The lens element L4 has a convex object-side surface and a concave image-side surface. The lens element L5 is a biconcave lens element. The lens element L6 is a biconvex lens element. The lens elements L5 and L6 together form a cemented lens in which the concave and convex surfaces thereof having the same radius of curvature are cemented together and form a cemented surface R9.

The third lens unit GR3 has a positive refractive power and includes three lens elements L7, L8, and L9 arranged in that order from the object side to the image side. The lens element L7 forms a positive sub-unit GR3-1 having a positive refractive power. The lens elements L8 and L9 together form a negative sub-unit GR3-2 having a negative refractive power.

The lens element L7 is a biconvex lens element. The lens elements L8 and L9 each have a convex object-side surface and a concave image-side surface. The lens elements L8 and L9 together form a cemented lens in which the concave and convex surfaces thereof having the same radius of curvature are cemented together and form a cemented surface R15.

The fourth lens unit GR4 has a positive refractive power and includes a lens element L10.

The lens element L10 is a biconvex lens element.

The fifth lens unit GR5 has a positive refractive power and includes two lens elements L11 and L12 arranged in that order from the object side to the image side. The lens element L11 forms a fixed sub-unit GR5-1 having a negative refractive power and whose position is fixed. The lens element L12 forms a movable sub-unit GR5-2 having a positive refractive power and being movable in a direction substantially perpendicular to the optical axis.

The lens element L11 has a convex object-side surface and a concave image-side surface. The lens element L12 is a biconvex lens element.

An aperture stop IR (stop surface R11) is provided between the second lens unit GR2 and the third lens unit GR3. A filter FL is provided between the fifth lens unit GR5 and an image surface IMG.

Table 1 summarizes lens data in Numerical Example 1A provided by applying specific values to the zoom lens 1A of the first exemplary embodiment.

TABLE 1

| | Ri | Di | Ni | vi |
|---|---|---|---|---|
| R1 | 129.606 | D1 1.000 | N1 1.847 | v1 23.8 |
| R2 | 25.995 | D2 3.740 | N2 1.697 | v2 55.5 |
| R3 | −115.191 | D3 0.150 | N3 1.883 | v3 40.8 |
| R4 | 25.836 | D4 2.184 | N4 1.851 | v4 40.1 |
| R5 | 92.318 | D5 Variable | N5 1.883 | v5 40.8 |
| R6 | 92.318 | D6 0.700 | N6 1.946 | v6 18.0 |
| R7 (ASP) | 9.916 | D7 2.096 | N7 1.694 | v7 53.2 |
| R8 | −11.140 | D8 0.450 | N8 1.487 | v8 70.5 |
| R9 | 11.140 | D9 1.592 | N9 2.001 | v9 25.5 |
| R10 | −166.445 | D10 Variable | N10 1.553 | v10 71.7 |
| R11 | STOP ∞ | D11 1.580 | N11 1.623 | v11 58.2 |
| R12 (ASP) | 14.122 | D12 2.793 | N12 1.553 | v12 71.7 |
| R13 (ASP) | −30.497 | D13 1.048 | NFL 1.517 | vFL 64.2 |
| R14 | 12.630 | D14 2.608 | | |
| R15 | 209.927 | D15 0.500 | | |
| R16 | 12.248 | D16 Variable | | |
| R17 (ASP) | 12.368 | D17 2.343 | | |
| R18 (ASP) | −24.913 | D18 Variable | | |
| R19 | 73.378 | D19 0.750 | | |
| R20 (ASP) | 7.143 | D20 1.750 | | |
| R21 | 10.349 | D21 2.763 | | |
| R22 (ASP) | −32.359 | D22 3.241 | | |
| R23 | FILTER ∞ | DFL 1.673 | | |
| R24 | FILTER ∞ | | | |

In the zoom lens 1A, the following surfaces are aspherical: the image-side surface (R7) of the lens element L4 included in the second lens unit GR2, the object-side surface (R12) of the lens element L7 included in the third lens unit GR3, the image-side surface (R13) of the lens element L7 included in the third lens unit GR3, the object-side surface (R17) of the lens element L10 included in the fourth lens unit GR4, the image-side surface (R18) of the lens element L10 included in the fourth lens unit GR4, the image-side surface (R20) of the lens element L11 included in the fifth lens unit GR5, and the image-side surface (R22) of the lens element L12 included in the fifth lens unit GR5. Table 2 summarizes fourth-, sixth-, eighth-, and tenth-order aspherical coefficients A4, A6, A8, and A10 of the individual aspherical surfaces in Numerical Example 1A.

In Tables 2 and others below summarizing the aspherical coefficients, "E-i" is an exponential expression with a radix number of 10, i.e., "10$^{-i}$". For example, "0.12345E-05" represents "0.12345×10$^{-5}$".

TABLE 2

| | ASPHERICAL COEFFICIENT | | | |
|---|---|---|---|---|
| | A4 | A6 | A8 | A10 |
| R7 | 5.092E−06 | −4.945E−06 | 3.745E−07 | −1.205E−08 |
| R12 | 2.432E−09 | −6.166E−05 | 0.000E+00 | 0.000E+00 |
| R13 | 4.027E−05 | 0.000E+00 | 0.000E+00 | 0.000E+00 |
| R17 | −9.972E−05 | −2.000E−07 | 0.000E+00 | 0.000E+00 |
| R18 | 4.229E−05 | 0.000E+00 | 0.000E+00 | 0.000E+00 |
| R20 | −1.475E−04 | 8.945E−07 | −1.093E−07 | 0.000E+00 |
| R22 | 1.731E−04 | −2.958E−06 | 5.118E−08 | 0.000E−00 |

When zooming between the wide-angle end and the telephoto end is performed in the zoom lens 1A, the following surface distances change: a surface distance D5 between the first lens unit GR1 and the second lens unit GR2, a surface distance D10 between the second lens unit GR2 and the aperture stop IR, a surface distance D16 between the third lens unit GR3 and the fourth lens unit GR4, and a surface distance D18 between the fourth lens unit GR4 and the fifth lens unit GR5. Table 3 summarizes the foregoing variable surface distances at the wide-angle end (focal length ratio: 1.00), at an intermediate focal length (focal length ratio: 5.25), and at the telephoto end (focal length ratio: 10.92) in Numerical Example 1A in a case where the object is at infinity.

TABLE 3

| FOCAL LENGTH RATIO | 1.00 | 5.25 | 10.92 |
|---|---|---|---|
| D5 | 0.720 | 15.550 | 20.135 |
| D10 | 20.755 | 5.926 | 1.340 |
| D16 | 6.656 | 2.288 | 6.848 |
| D18 | 1.391 | 5.760 | 1.200 |

Figure 2:
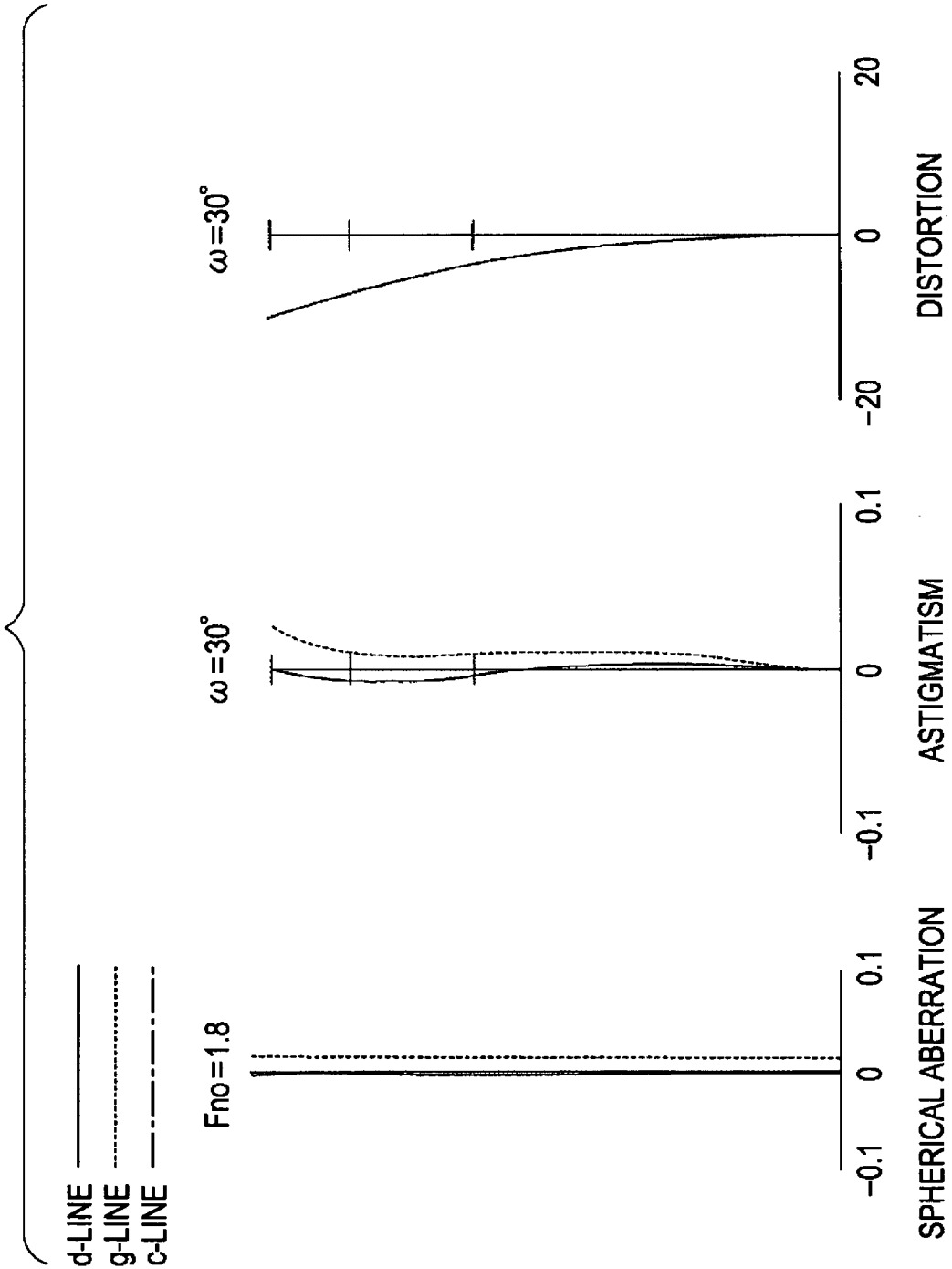
FIG. 2 shows, together with FIGS. 3 and 4, aberrations in a numerical example provided by applying specific values to the first exemplary embodiment, and specifically shows spherical aberration, astigmatism, and distortion at a wide-angle end.
Figure 3:
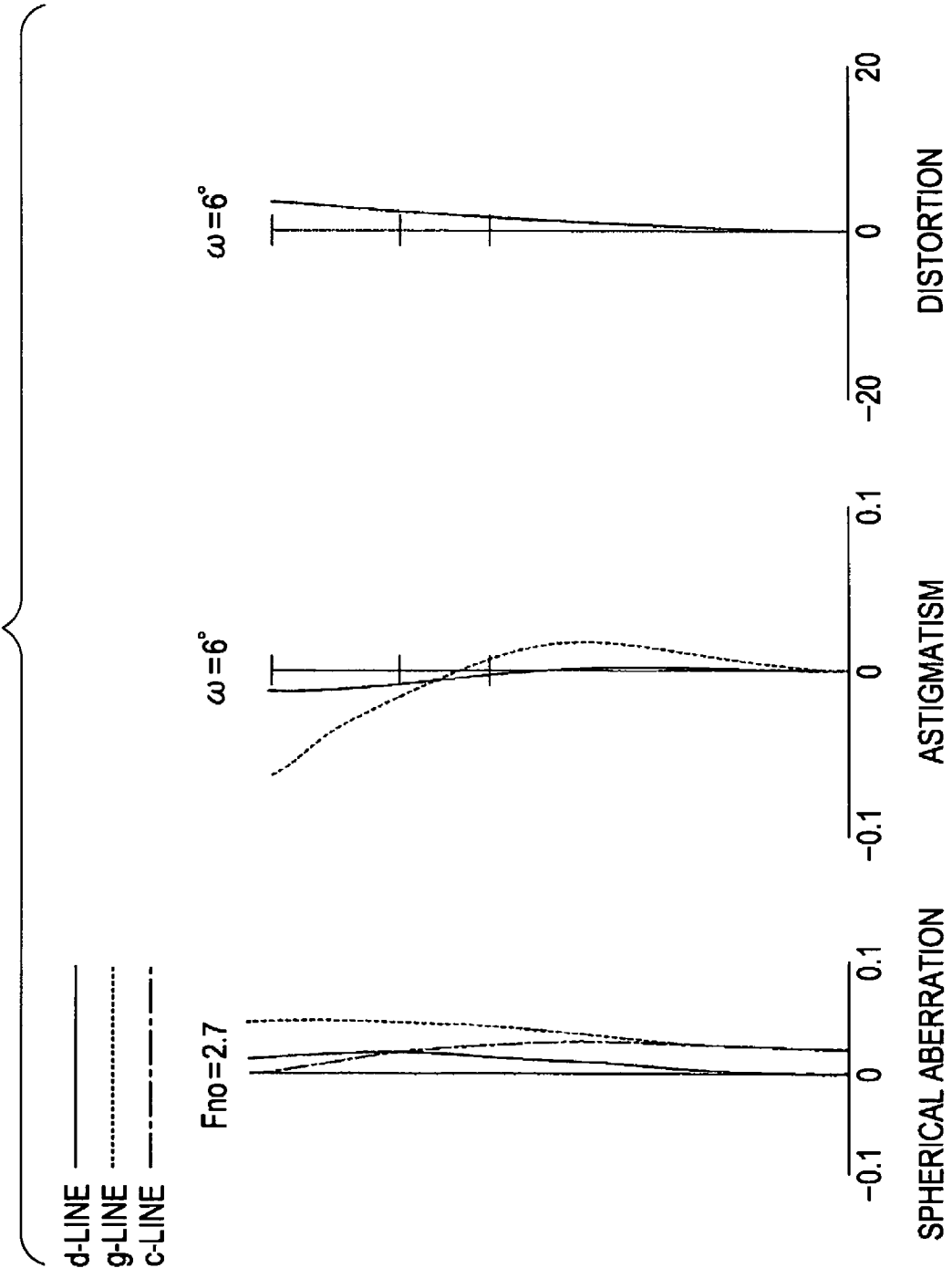
FIG. 3 shows spherical aberration, astigmatism, and distortion at an intermediate focal length.
Figure 4:
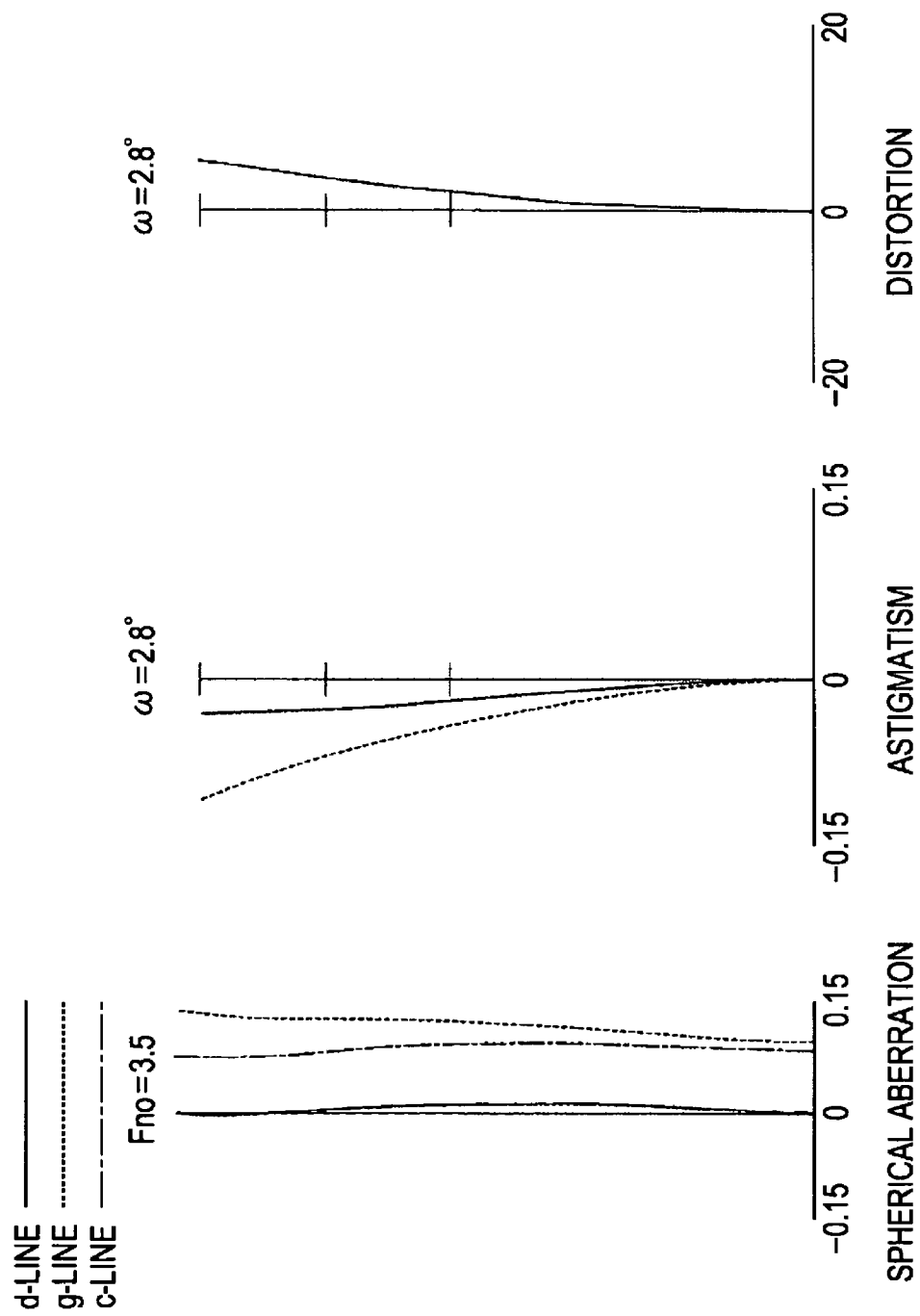
FIG. 4 shows spherical aberration, astigmatism, and distortion at a telephoto end.

FIGS. 2 to 4 are aberration diagrams for Numerical Example 1A when the focus is on an object at infinity. FIG. 2 shows aberrations at the wide-angle end (focal length ratio: 1.00). FIG. 3 shows aberrations at the intermediate focal length (focal length ratio: 5.25). FIG. 4 shows aberrations at the telephoto end (focal length ratio: 10.92).

In FIGS. 2 to 4, the spherical aberration diagrams each show values for the d-line (wavelength of 587.6 nm), the g-line (wavelength of 435.8 nm), and the c-line (wavelength of 656.3 nm), and the astigmatism diagrams each show values for the sagittal image plane in the solid line and values for the meridional image plane in the broken line.

As shown in the aberration diagrams, it is obvious that aberrations are corrected well and high imaging performance is realized in Numerical Example 1A.

Second Exemplary Embodiment

Figure 5:
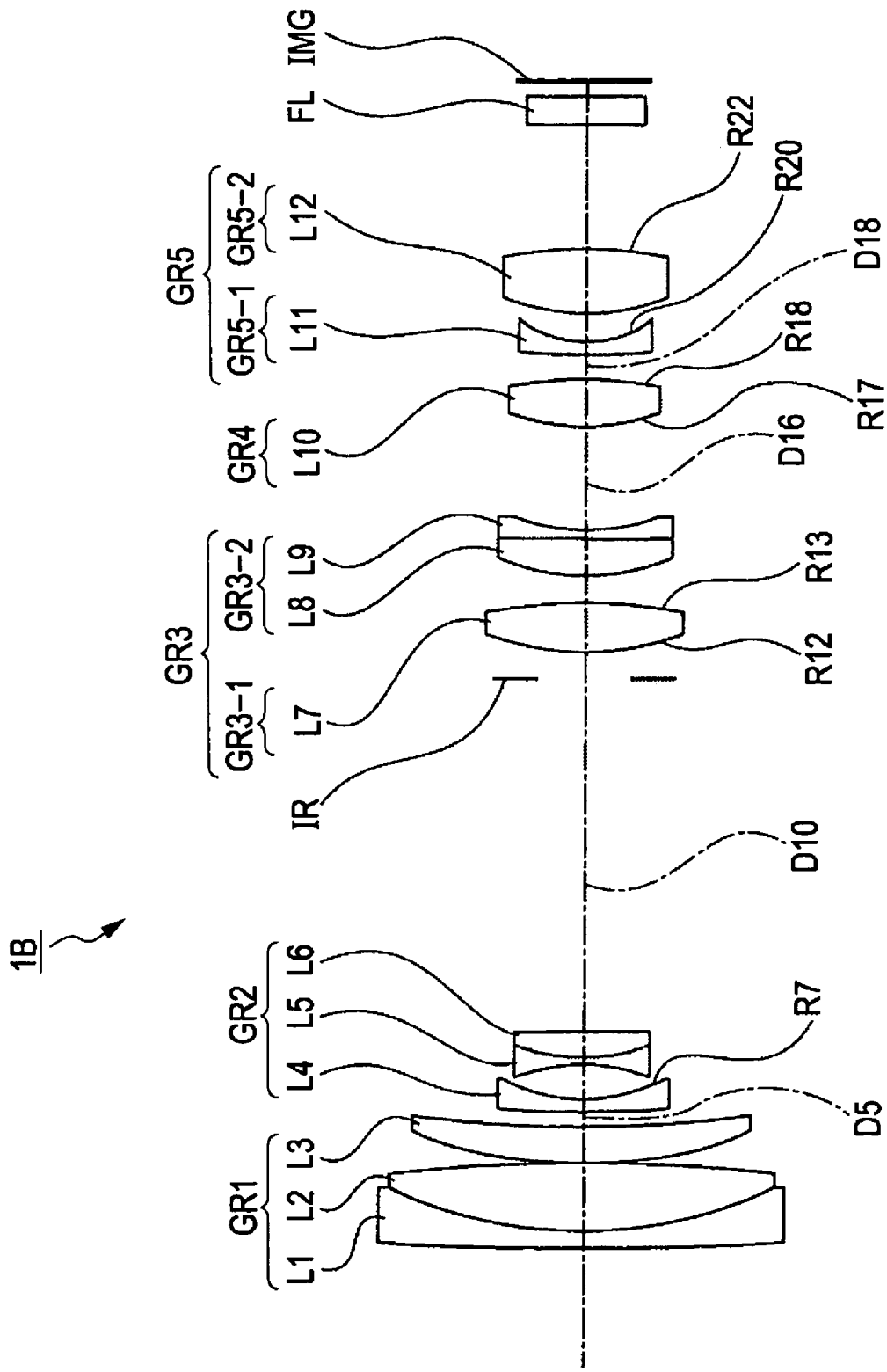
FIG. 5 shows the configuration of a zoom lens according to a second exemplary embodiment of the present invention.

FIG. 5 shows the configuration of the zoom lens 1B according to the second exemplary embodiment of the present invention. The zoom lens 1B includes twelve lens elements.

The first lens unit GR1 has a positive refractive power and includes three lens elements L1, L2, and L3 arranged in that order from the object side to the image side.

The lens element L1 has a convex object-side surface and a concave image-side surface. The lens element L2 is a biconvex lens element. The lens elements L1 and L2 together form a cemented lens in which the concave and convex surfaces thereof having the same radius of curvature are cemented together and form a cemented surface R2. The lens element L3 is a meniscus lens element with a concave surface thereof facing the image side.

The second lens unit GR2 has a negative refractive power and includes three lens elements L4, L5, and L6 arranged in that order from the object side to the image side.

The lens element L4 has a convex object-side surface and a concave image-side surface. The lens element L5 is a biconcave lens element. The lens element L6 is a biconvex lens element. The lens elements L5 and L6 together form a cemented lens in which the concave and convex surfaces thereof having the same radius of curvature are cemented together and form a cemented surface R9.

The third lens unit GR3 has a positive refractive power and includes three lens elements L7, L8, and L9 arranged in that order from the object side to the image side. The lens element L7 forms a positive sub-unit GR3-1 having a positive refractive power. The lens elements L8 and L9 together form a negative sub-unit GR3-2 having a negative refractive power.

The lens element L7 is a biconvex lens element. The lens element L8 is a biconvex lens element. The lens element L9 is a biconcave lens element. The lens elements L8 and L9 together form a cemented lens in which the concave and convex surfaces thereof having the same radius of curvature are cemented together and form a cemented surface R15.

The fourth lens unit GR4 has a positive refractive power and includes a lens element L10.

The lens element L10 is a biconvex lens element.

The fifth lens unit GR5 has a positive refractive power and includes two lens elements L11 and L12 arranged in that order from the object side to the image side. The lens element L11 forms a fixed sub-unit GR5-1 having a negative refractive power and whose position is fixed. The lens element L12 forms a movable sub-unit GR5-2 having a positive refractive power and being movable in a direction substantially perpendicular to the optical axis.

The lens element L11 has a convex object-side surface and a concave image-side surface. The lens element L12 is a biconvex lens element.

An aperture stop IR (stop surface R11) is provided between the second lens unit GR2 and the third lens unit GR3. A filter FL is provided between the fifth lens unit GR5 and an image surface IMG.

Table 4 summarizes lens data in Numerical Example 1B provided by applying specific values to the zoom lens 1B of the second exemplary embodiment.

TABLE 4

| Ri | | Di | | Ni | | vi | |
|---|---|---|---|---|---|---|---|
| R1 | 154.173 | D1 | 1.000 | N1 | 1.847 | v1 | 23.8 |
| R2 | 26.590 | D2 | 3.793 | N2 | 1.697 | v2 | 55.5 |
| R3 | −95.312 | D3 | 0.150 | N3 | 1.883 | v3 | 40.8 |
| R4 | 25.200 | D4 | 2.184 | N4 | 1.851 | v4 | 40.1 |
| R5 | 83.836 | D5 | Variable | N5 | 1.883 | v5 | 40.8 |
| R6 | 83.836 | D6 | 0.700 | N6 | 1.946 | v6 | 18.0 |
| R7 (ASP) | 9.686 | D7 | 1.954 | N7 | 1.694 | v7 | 53.2 |
| R8 | −10.968 | D8 | 0.450 | N8 | 1.487 | v8 | 70.5 |
| R9 | 10.968 | D9 | 1.604 | N9 | 2.001 | v9 | 25.5 |
| R10 | −176.584 | D10 | Variable | N10 | 1.553 | v10 | 71.7 |
| R11 | STOP ∞ | D11 | 1.580 | N11 | 1.623 | v11 | 58.2 |
| R12 (ASP) | 16.022 | D12 | 2.639 | N12 | 1.553 | v12 | 71.7 |
| R13 (ASP) | −30.076 | D13 | 1.715 | NFL | 1.517 | vFL | 64.2 |

TABLE 4-continued

| Ri | | Di | | Ni | vi |
|---|---|---|---|---|---|
| R14 | 13.247 | D14 | 2.160 | | |
| R15 | −229.188 | D15 | 0.500 | | |
| R16 | 15.371 | D16 | Variable | | |
| R17 (ASP) | 12.463 | D17 | 2.392 | | |
| R18 (ASP) | −21.849 | D18 | Variable | | |
| R19 | 100.000 | D19 | 0.750 | | |
| R20 (ASP) | 7.143 | D20 | 1.750 | | |
| R21 | 11.803 | D21 | 3.489 | | |
| R22 (ASP) | −25.706 | D22 | 3.166 | | |
| R23 | FILTER ∞ | DFL | 1.673 | | |
| R24 | FILTER ∞ | | | | |

In the zoom lens 1B, the following surfaces are aspherical: the image-side surface (R7) of the lens element L4 included in the second lens unit GR2, the object-side surface (R12) of the lens element L7 included in the third lens unit GR3, the image-side surface (R13) of the lens element L7 included in the third lens unit GR3, the object-side surface (R17) of the lens element L10 included in the fourth lens unit GR4, the image-side surface (R18) of the lens element L10 included in the fourth lens unit GR4, the image-side surface (R20) of the lens element L11 included in the fifth lens unit GR5, and the image-side surface (R22) of the lens element L12 included in the fifth lens unit GR5. Table 5 summarizes fourth-, sixth-, eighth-, and tenth-order aspherical coefficients A4, A6, A8, and A10 of the individual aspherical surfaces in Numerical Example 1B.

TABLE 5

ASPHERICAL COEFFICIENT

| | A4 | A6 | A8 | A10 |
|---|---|---|---|---|
| R7 | 8.198E−06 | −5.858E−06 | 5.000E−07 | −1.688E−08 |
| R12 | −4.978E−05 | 3.161E−08 | 0.000E+00 | 0.000E+00 |
| R13 | 3.405E−05 | 0.000E+00 | 0.000E+00 | 0.000E+00 |
| R17 | −8.833E−05 | −1.630E−07 | 0.000E−00 | 0.000E+00 |
| R18 | 7.692E−05 | 0.000E+00 | 0.000E+00 | 0.000E+00 |
| R20 | −1.185E−04 | −1.677E−06 | −1.176E−07 | 0.000E+00 |
| R22 | 1.385E−04 | 2.001E−07 | 3.556E−08 | 0.000E−00 |

When zooming between the wide-angle end and the telephoto end is performed in the zoom lens 1B, the following surface distances change: a surface distance D5 between the first lens unit GR1 and the second lens unit GR2, a surface distance D10 between the second lens unit GR2 and the aperture stop IR, a surface distance D16 between the third lens unit GR3 and the fourth lens unit GR4, and a surface distance D18 between the fourth lens unit GR4 and the fifth lens unit GR5. Table 6 summarizes the foregoing variable surface distances at the wide-angle end (focal length ratio: 1.00), at an intermediate focal length (focal length ratio: 5.24), and at the telephoto end (focal length ratio: 10.86) in Numerical Example 1B in a case where the object is at infinity.

TABLE 6

| FOCAL LENGTH RATIO | 1.00 | 5.24 | 10.86 |
|---|---|---|---|
| D5 | 0.720 | 15.463 | 19.912 |
| D10 | 20.532 | 5.789 | 1.340 |
| D16 | 6.028 | 2.151 | 5.984 |
| D18 | 1.554 | 5.432 | 1.598 |

Figure 6:
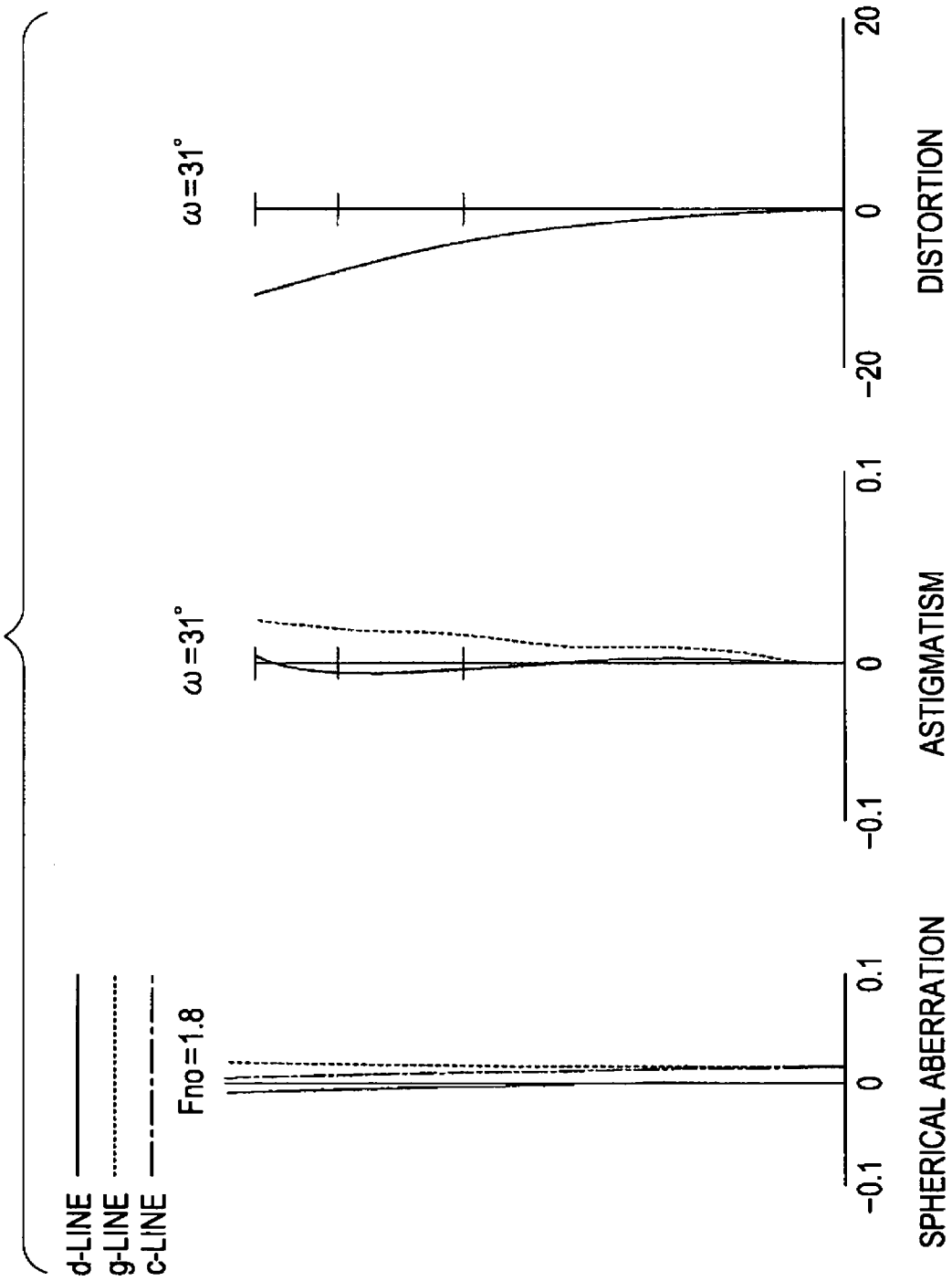
FIG. 6 shows, together with FIGS. 7 and 8, aberrations in a numerical example provided by applying specific values to the second exemplary embodiment, and specifically shows spherical aberration, astigmatism, and distortion at a wide-angle end.
Figure 7:
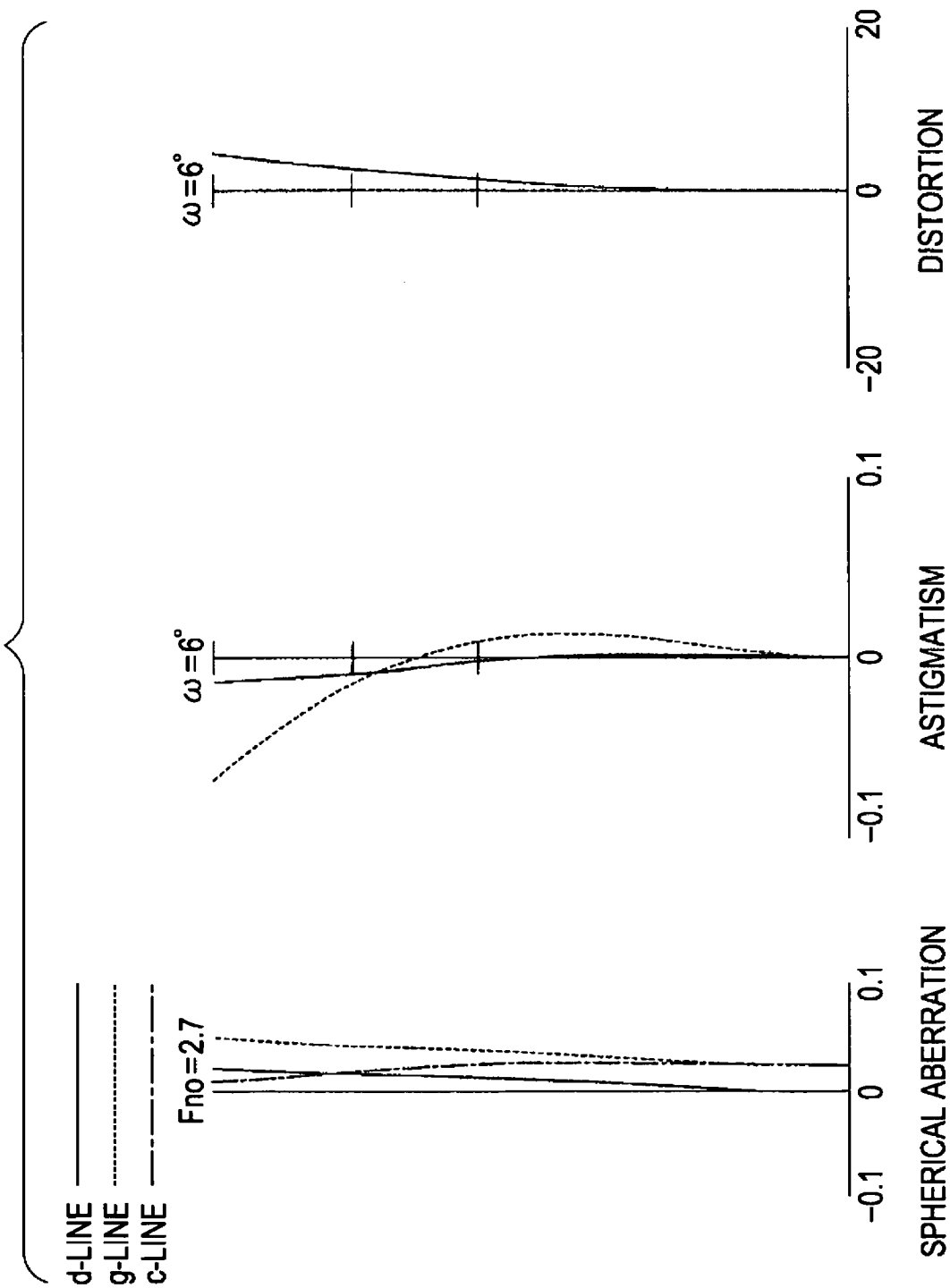
FIG. 7 shows spherical aberration, astigmatism, and distortion at an intermediate focal length.
Figure 8:
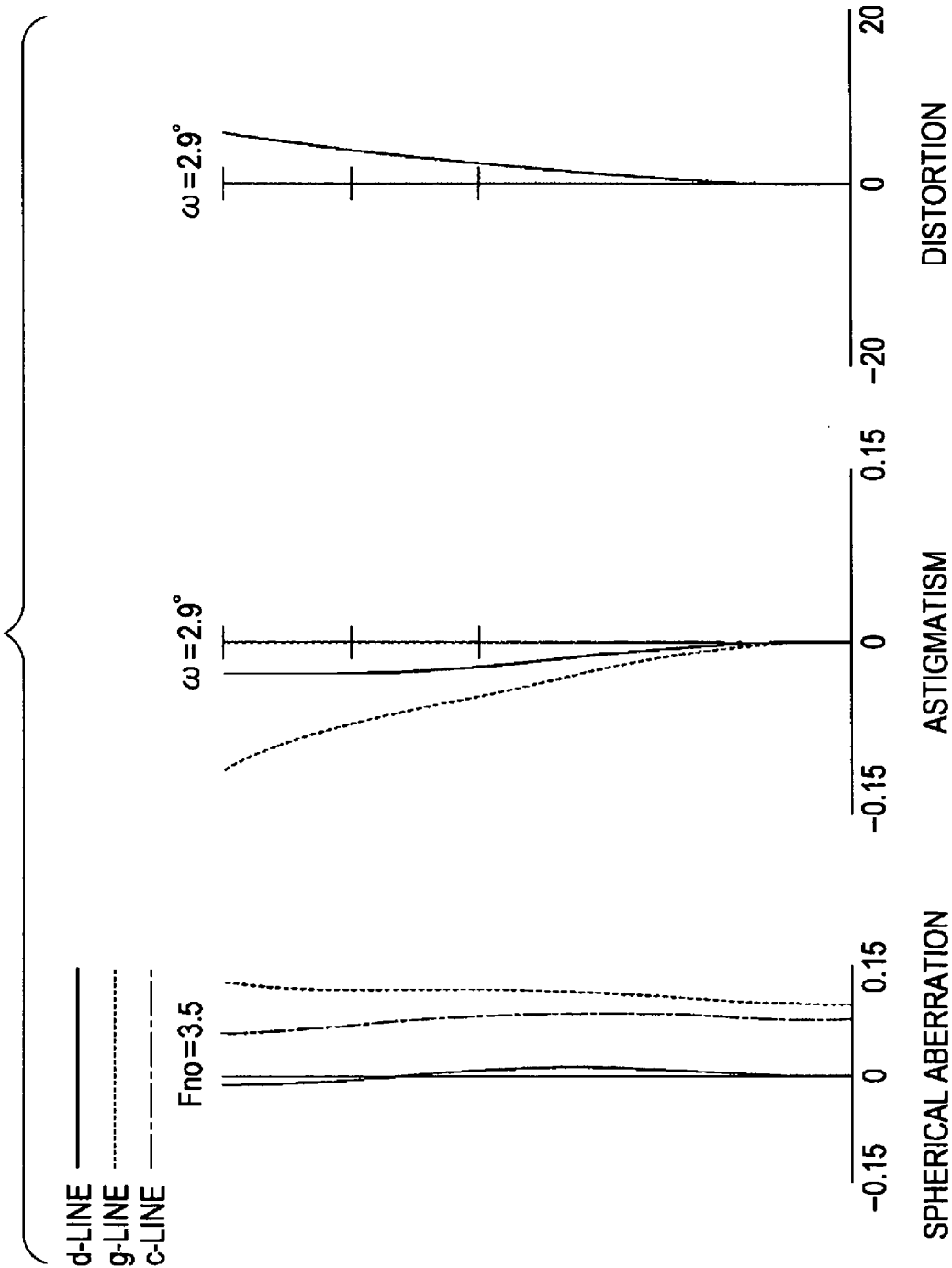
FIG. 8 shows spherical aberration, astigmatism, and distortion at a telephoto end.

FIGS. 6 to 8 are aberration diagrams for Numerical Example 1B when the focus is on an object at infinity. FIG. 6 shows aberrations at the wide-angle end (focal length ratio: 1.00). FIG. 7 shows aberrations at the intermediate focal length (focal length ratio: 5.24). FIG. 8 shows aberrations at the telephoto end (focal length ratio: 10.86).

In FIGS. 6 to 8, the spherical aberration diagrams each show values for the d-line (wavelength of 587.6 nm), the g-line (wavelength of 435.8 nm), and the c-line (wavelength of 656.3 nm), and the astigmatism diagrams each show values for the sagittal image plane in the solid line and values for the meridional image plane in the broken line.

As shown in the aberration diagrams, it is obvious that aberrations are corrected well and high imaging performance is realized in Numerical Example 1B.

Third Exemplary Embodiment

Figure 9:
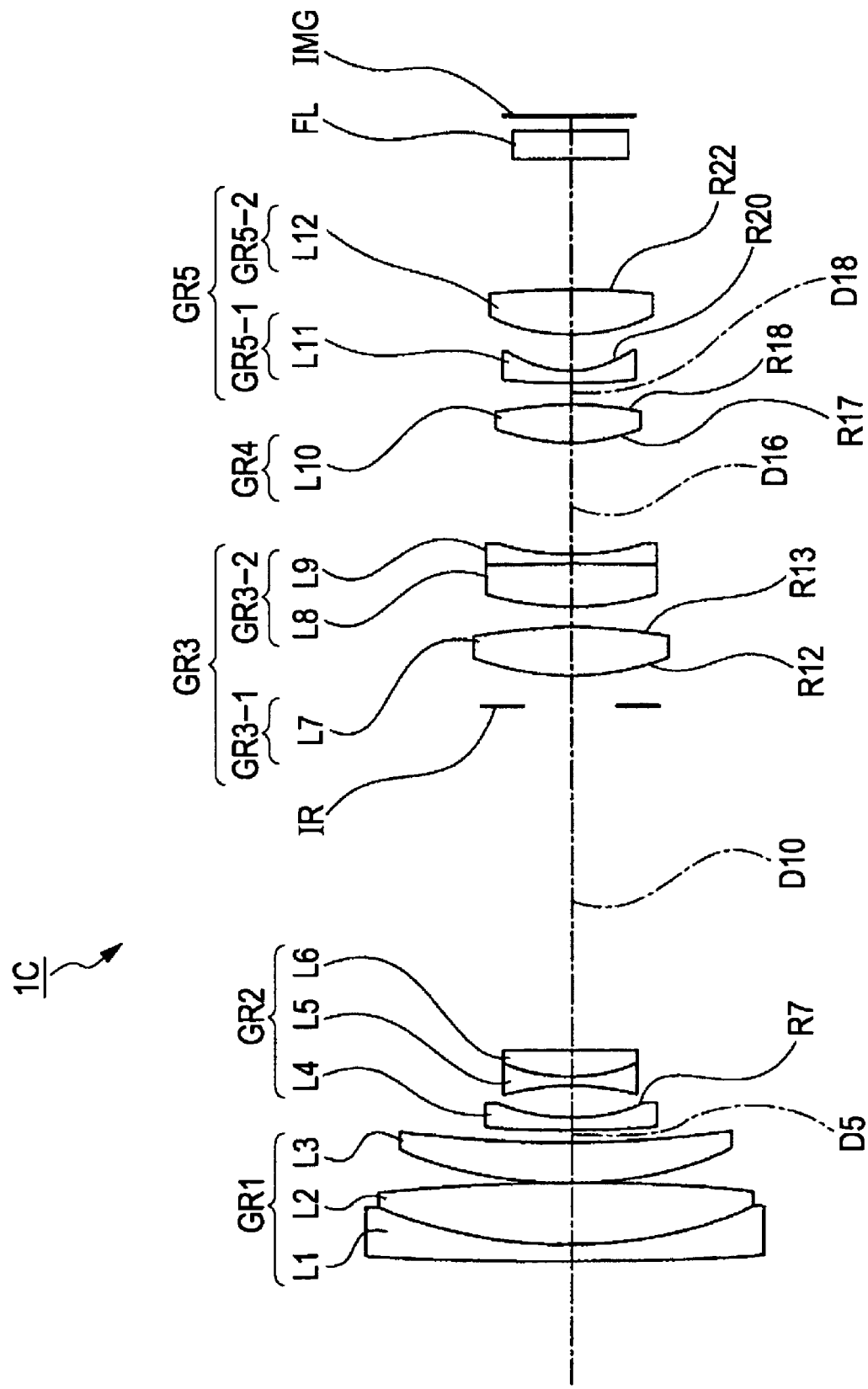
FIG. 9 shows the configuration of a zoom lens according to a third exemplary embodiment of the present invention.

FIG. 9 shows the configuration of the zoom lens 1C according to the third exemplary embodiment of the present invention. The zoom lens 1C includes twelve lens elements.

The first lens unit GR1 has a positive refractive power and includes three lens elements L1, L2, and L3 arranged in that order from the object side to the image side.

The lens element L1 has a convex object-side surface and a concave image-side surface. The lens element L2 is a biconvex lens element. The lens elements L1 and L2 together form a cemented lens in which the concave and convex surfaces thereof having the same radius of curvature are cemented together and form a cemented surface R2. The lens element L3 is a meniscus lens element with a concave surface thereof facing the image side.

The second lens unit GR2 has a negative refractive power and includes three lens elements L4, L5, and L6 arranged in that order from the object side to the image side.

The lens element L4 has a convex object-side surface and a concave image-side surface. The lens element L5 is a biconcave lens element. The lens element L6 is a biconvex lens element. The lens elements L5 and L6 together form a cemented lens in which the concave and convex surfaces thereof having the same radius of curvature are cemented together and form a cemented surface R9.

The third lens unit GR3 has a positive refractive power and includes three lens elements L7, L8, and L9 arranged in that order from the object side to the image side. The lens element L7 forms a positive sub-unit GR3-1 having a positive refractive power. The lens elements L8 and L9 together form a negative sub-unit GR3-2 having a negative refractive power.

The lens element L7 is a biconvex lens element. The lens element L8 is a biconvex lens element. The lens element L9 is a biconcave lens element. The lens elements L8 and L9 together form a cemented lens in which the concave and convex surfaces thereof having the same radius of curvature are cemented together and form a cemented surface R15.

The fourth lens unit GR4 has a positive refractive power and includes a lens element L10.

The lens element L10 is a biconvex lens element.

The fifth lens unit GR5 has a positive refractive power and includes two lens elements L11 and L12 arranged in that order from the object side to the image side. The lens element L11 forms a fixed sub-unit GR5-1 having a negative refractive power and whose position is fixed. The lens element L12 forms a movable sub-unit GR5-2 having a positive refractive power and being movable in a direction substantially perpendicular to the optical axis.

The lens element L11 has a convex object-side surface and a concave image-side surface. The lens element L12 is a biconvex lens element.

An aperture stop IR (stop surface R11) is provided between the second lens unit GR2 and the third lens unit GR3. A filter FL is provided between the fifth lens unit GR5 and an image surface IMG.

Table 7 summarizes lens data in Numerical Example 1C provided by applying specific values to the zoom lens 1C of the third exemplary embodiment.

TABLE 7

| Ri | | Di | | Ni | | vi | |
|---|---|---|---|---|---|---|---|
| R1 | 122.392 | D1 | 1.000 | N1 | 1.847 | v1 | 23.8 |
| R2 | 25.503 | D2 | 3.768 | N2 | 1.697 | v2 | 55.5 |
| R3 | −121.127 | D3 | 0.150 | N3 | 1.883 | v3 | 40.8 |
| R4 | 25.518 | D4 | 2.213 | N4 | 1.851 | v4 | 40.1 |
| R5 | 92.415 | D5 | Variable | N5 | 1.883 | v5 | 40.8 |
| R6 | 92.415 | D6 | 0.700 | N6 | 1.946 | v6 | 18.0 |
| R7 (ASP) | 9.720 | D7 | 2.131 | N7 | 1.694 | v7 | 53.2 |
| R8 | −11.099 | D8 | 0.450 | N8 | 1.487 | v8 | 70.5 |
| R9 | 11.140 | D9 | 1.596 | N9 | 2.001 | v9 | 25.5 |
| R10 | −164.396 | D10 | Variable | N10 | 1.553 | v10 | 71.7 |
| R11 | STOP ∞ | D11 | 1.580 | N11 | 1.623 | v11 | 58.2 |
| R12 (ASP) | 13.178 | D12 | 2.984 | N12 | 1.553 | v12 | 71.7 |
| R13 (ASP) | −25.906 | D13 | 1.290 | NFL | 1.517 | vFL | 64.2 |
| R14 | 18.401 | D14 | 2.331 | | | | |
| R15 | −104.023 | D15 | 0.500 | | | | |
| R16 | 14.415 | D16 | Variable | | | | |
| R17 (ASP) | 12.382 | D17 | 2.384 | | | | |
| R18 (ASP) | −22.890 | D18 | Variable | | | | |
| R19 | 66.992 | D19 | 0.750 | | | | |
| R20 (ASP) | 7.143 | D20 | 1.818 | | | | |
| R21 | 10.204 | D21 | 2.732 | | | | |
| R22 (ASP) | −35.929 | D22 | 3.279 | | | | |
| R23 | FILTER ∞ | DFL | 1.673 | | | | |
| R24 | FILTER ∞ | | | | | | |

In the zoom lens 1C, the following surfaces are aspherical: the image-side surface (R7) of the lens element L4 included in the second lens unit GR2, the object-side surface (R12) of the lens element L7 included in the third lens unit GR3, the image-side surface (R13) of the lens element L7 included in the third lens unit GR3, the object-side surface (R17) of the lens element L10 included in the fourth lens unit GR4, the image-side surface (R18) of the lens element L10 included in the fourth lens unit GR4, the image-side surface (R20) of the lens element L11 included in the fifth lens unit GR5, and the image-side surface (R22) of the lens element L12 included in the fifth lens unit GR5. Table 8 summarizes fourth-, sixth-, eighth-, and tenth-order aspherical coefficients A4, A6, A8, and A10 of the individual aspherical surfaces in Numerical Example 1C.

TABLE 8

| | ASPHERICAL COEFFICIENT | | | |
|---|---|---|---|---|
| | A4 | A6 | A8 | A10 |
| R7 | −7.501E−06 | −2.418E−06 | 2.015E−07 | −7.752E−09 |
| R12 | −8.096E−05 | 2.534E−27 | 0.000E+00 | 0.000E+00 |
| R13 | 5.255E−05 | 0.000E+00 | 0.000E+00 | 0.000E+00 |
| R17 | −9.799E−05 | −2.000E−07 | 0.000E+00 | 0.000E−00 |
| R18 | 4.805E−05 | 0.000E+00 | 0.000E+00 | 0.000E+00 |
| R20 | −1.446E−04 | −1.689E−07 | −6.959E−08 | 0.000E+00 |
| R22 | 1.700E−04 | −1.898E−06 | 3.339E−08 | 0.000E−00 |

When zooming between the wide-angle end and the telephoto end is performed in the zoom lens 1C, the following surface distances change: a surface distance D5 between the first lens unit GR1 and the second lens unit GR2, a surface distance D10 between the second lens unit GR2 and the aperture stop IR, a surface distance D16 between the third lens unit GR3 and the fourth lens unit GR4, and a surface distance D18 between the fourth lens unit GR4 and the fifth lens unit GR5. Table 9 summarizes the foregoing variable surface distances at the wide-angle end (focal length ratio: 1.00), at an intermediate focal length (focal length ratio: 5.22), and at the telephoto end (focal length ratio: 10.92) in Numerical Example 1C in a case where the object is at infinity.

TABLE 9

| FOCAL LENGTH RATIO | 1.00 | 5.22 | 10.92 |
|---|---|---|---|
| D5 | 0.720 | 15.314 | 19.832 |
| D10 | 20.452 | 5.858 | 1.340 |
| D16 | 6.586 | 2.274 | 6.782 |
| D18 | 1.396 | 5.708 | 1.200 |

Figure 10:
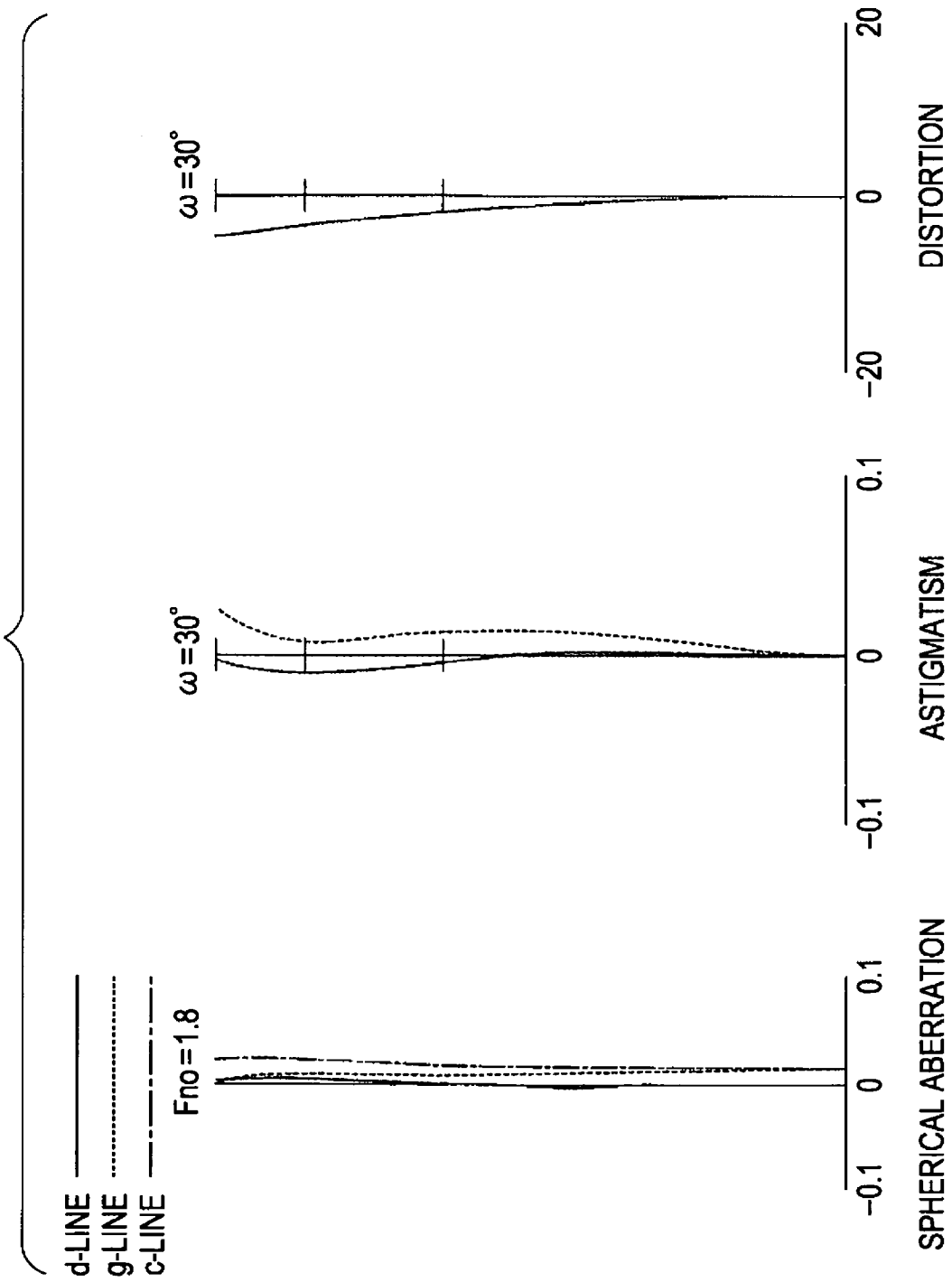
FIG. 10 shows, together with FIGS. 11 and 12, aberrations in a numerical example provided by applying specific values to the third exemplary embodiment, and specifically shows spherical aberration, astigmatism, and distortion at a wide-angle end.
Figure 11:
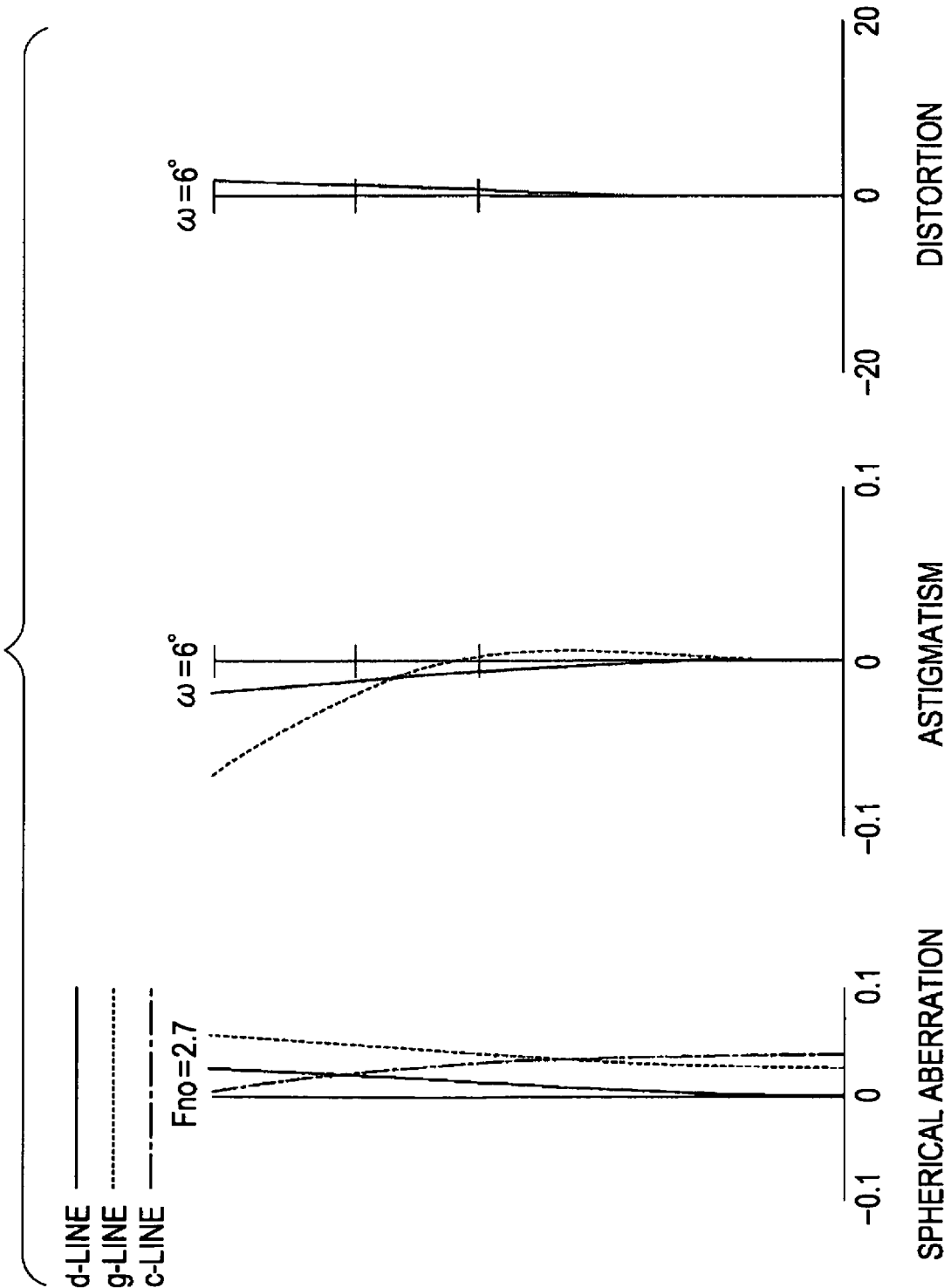
FIG. 11 shows spherical aberration, astigmatism, and distortion at an intermediate focal length.
Figure 12:
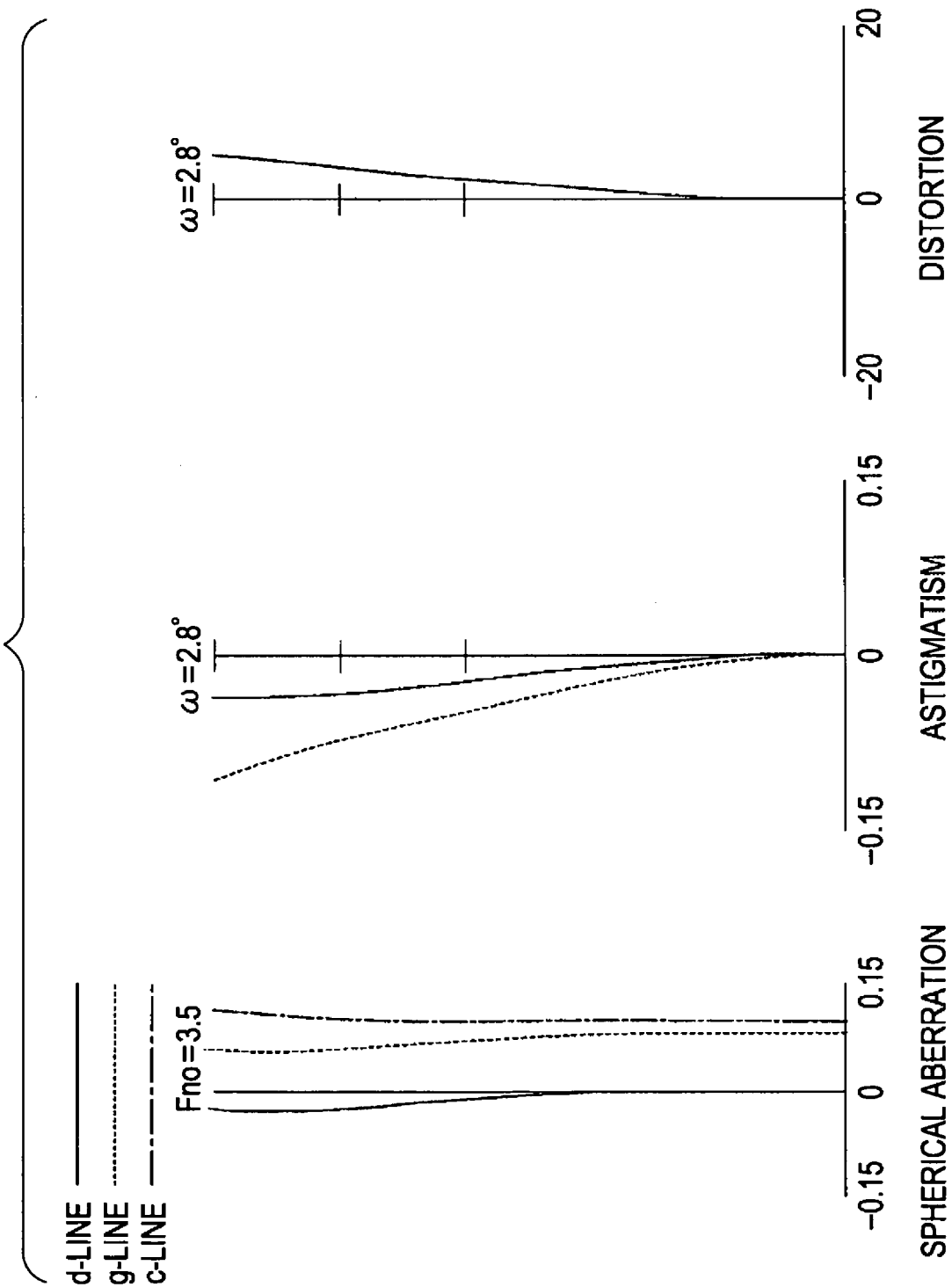
FIG. 12 shows spherical aberration, astigmatism, and distortion at a telephoto end.

FIGS. 10 to 12 are aberration diagrams for Numerical Example 1C when the focus is on an object at infinity. FIG. 10 shows aberrations at the wide-angle end (focal length ratio: 1.00). FIG. 11 shows aberrations at the intermediate focal length (focal length ratio: 5.22). FIG. 12 shows aberrations at the telephoto end (focal length ratio: 10.92).

In FIGS. 10 to 12, the spherical aberration diagrams each show values for the d-line (wavelength of 587.6 nm), the g-line (wavelength of 435.8 nm), and the c-line (wavelength of 656.3 nm), and the astigmatism diagrams each show values for the sagittal image plane in the solid line and values for the meridional image plane in the broken line.

As shown in the aberration diagrams, it is obvious that aberrations are corrected well and high imaging performance is realized in Numerical Example 1C.

Summary of Conditional Expressions

Table 10 summarizes values in Conditional Expressions (1) to (4) for the individual zoom lenses 1A, 1B, and 1C.

That is, Table 10 summarizes values of f31, f32, and |f31/f32| in Conditional Expression (1), values of fw, f31, and fw/f31 in Conditional Expression (2), values of f32f, f32s, and |f32f/f32s| in Conditional Expression (3), and values of f3, f32s, and f3/f32s in Conditional Expression (4).

TABLE 10

| | | ZOOM LENS 1A | ZOOM LENS 1B | ZOOM LENS 1C |
|---|---|---|---|---|
| | f31 | 14.22 | 15.37 | 12.94 |
| | f32 | −28.59 | −37.25 | −22.23 |
| CONDITIONAL EXPRESSION (1) | |f31/f32| | 0.50 | 0.41 | 0.58 |
| | fw | 5.70 | 5.59 | 5.66 |
| CONDITIONAL EXPRESSION (2) | fw/f31 | 0.40 | 0.36 | 0.44 |
| | f32f | −12.89 | −14.25 | −12.51 |
| | f32s | 27.35 | 25.68 | 32.17 |
| CONDITIONAL EXPRESSION (3) | |f32f/f32s| | 0.47 | 0.55 | 0.39 |
| | f3 | 19.22 | 19.79 | 19.47 |
| CONDITIONAL EXPRESSION (4) | f3/f32s | 0.70 | 0.77 | 0.61 |

As is obvious from Table 10, the zoom lenses 1A, 1B, and 1C each satisfy Conditional Expressions (1) to (4).

Configuration of Image Pickup Apparatus

An image pickup apparatus according to another general embodiment of the present invention will now be described.

An image pickup apparatus according to this general embodiment of the present invention includes a zoom lens and an image pickup device that converts an optical image formed by the zoom lens into an electrical signal.

In the image pickup apparatus according to the general embodiment of the present invention, the zoom lens includes, in order from an object side to an image side, a first lens unit having a positive refractive power, a second lens unit having a negative refractive power, a third lens unit having a positive refractive power, a fourth lens unit having a positive refractive power, and a fifth lens unit having a positive refractive power.

The first lens unit is fixed at a specific position. The second lens unit is movable mainly for zooming. The third lens unit is fixed at a specific position. The fourth lens unit is movable for correction of the focal position and focusing performed in response to zooming.

The fifth lens unit includes, in order from the object side to the image side, a fixed sub-unit having a negative refractive power and fixed at a specific position and a movable sub-unit having a positive refractive power and being movable in a direction substantially perpendicular to an optical axis.

In the image pickup apparatus according to the general embodiment of the present invention, the zoom lens is capable of moving an image formed on an image surface in a direction substantially perpendicular to the optical axis by moving the movable sub-unit of the fifth lens unit in the same direction.

As described above, in the image pickup apparatus according to the general embodiment of the present invention, the fifth lens unit of the zoom lens includes the fixed sub-unit and the movable sub-unit, and an image formed on the image surface is movable in a direction substantially perpendicular to the optical axis by moving the movable sub-unit, provided at the position nearest to an image-side end among all the lens units, in the same direction. Thus, image blurring due to camera shake or the like is corrected by the movement of the movable sub-unit of the fifth lens unit in a direction substantially perpendicular to the optical axis.

The effective diameter of a light beam passing through the lens unit nearest to the image-side end is relatively small. Since the sub-unit nearest to the image-side end is movable for the correction of image blurring, the size of a lens barrel housing the zoom lens is reduced.

Moreover, since the movable sub-unit is provided at the position nearest to the image-side end, changes in the positions where the light beam passes through the other lens units occurring at the time of correction of image blurring are small. Consequently, the size of the lens barrel is further reduced.

Besides, since the movable sub-unit is provided at the position nearest to the image-side end, restrictions of providing spaces on both sides of the movable sub-unit with respect to the optical axis are loosened. Consequently, optical performance is improved, and the size of the lens barrel is reduced.

In the image pickup apparatus according to the general embodiment of the present invention, an aperture stop of the zoom lens is provided on the object side of the third lens unit, and the third lens unit includes a positive sub-unit having a positive refractive power and a negative sub-unit having a negative refractive power.

Since the aperture stop is positioned on the object side of the third lens unit and the third lens unit includes the foregoing two sub-units, the total optical-axis-direction length of the third and subsequent lens units, which are provided on the image side with respect to the aperture stop and tend to become large in a configuration including five lens units, is reduced. Consequently, the overall size of the image pickup apparatus is reduced.

In addition, since the third lens unit includes the positive sub-unit and the negative sub-unit, aberration components, particularly, chromatic aberration at and near a wide-angle end, that are difficult to correct only with the fifth lens unit is corrected well.

With the configuration described above, a small-sized image pickup apparatus having an optical image stabilization function is provided with high image quality and high magnification.

Figure 13:
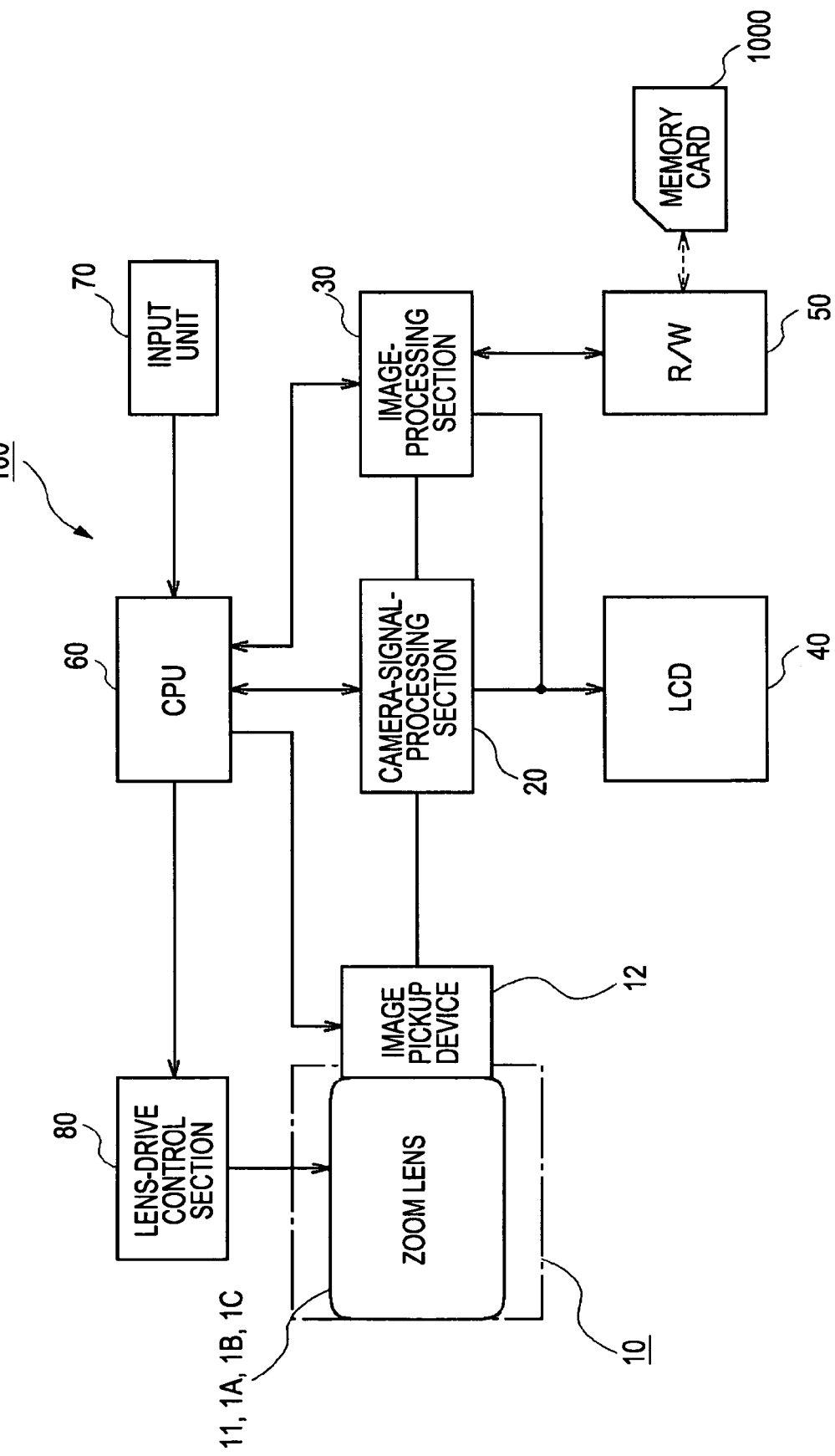
FIG. 13 is a block diagram of an image pickup apparatus according to an exemplary embodiment of the present invention.

FIG. 13 is a block diagram of a digital still camera as an exemplary embodiment of the image pickup apparatus according to the general embodiment of the present invention.

An image pickup apparatus (digital still camera) 100 includes a camera block 10 responsible for image pickup, a camera-signal-processing section 20 that performs signal processing such as analog-to-digital conversion of an image signal that is picked up, an image-processing section 30 that performs recording and reproduction of the image signal, a liquid crystal display (LCD) 40 that displays the picked-up image and other information, a reader-writer (R/W) 50 that writes and reads the image signal on and from a memory card 1000, a central processing unit (CPU) 60 that controls the entirety of the image pickup apparatus 100, an input unit 70 that includes various switches and the like through which a user performs desired operations, and a lens-drive control section 80 that controls the driving of a lens provided in the camera block 10.

The camera block 10 includes an optical system including a zoom lens 11 (any of the zoom lenses 1A, 1B, and 1C according to the exemplary embodiments of the present invention), an image pickup device 12 such as a charge-coupled device (CCD) or a complementary metal-oxide semiconductor (CMOS), and so forth.

The camera-signal-processing section 20 performs signal processing of an output signal from the image pickup device 12. The processing includes conversion into a digital signal, removal of noise, correction of image quality, and conversion into luminance and color-difference signals.

The image-processing section 30 performs, for example, compression-encoding and decompression-decoding of an image signal in accordance with a specific image data format, and conversion of data specifications including resolution and the like.

The LCD 40 has a function of displaying various pieces of data on operations performed on the input unit 70 by a user, images that have been picked up, and so forth.

The R/W 50 writes the image data encoded by the image-processing section 30 on the memory card 1000 and reads the image data stored in the memory card 1000.

The CPU 60 functions as a control-processing section that controls circuit blocks provided in the image pickup apparatus 100 in accordance with, for example, an instruction input signal issued from the input unit 70.

The input unit 70 includes, for example, a shutter release button provided for a shutter operation, a selection switch provided for selecting an operation mode, and so forth. The input unit 70 outputs an instruction input signal corresponding to an operation performed by a user to the CPU 60.

The lens-drive control section 80 controls motors and the like (not shown) that drive relevant lens elements included in the zoom lens 11 in accordance with a control signal from the CPU 60.

The memory card 1000 is, for example, a semiconductor memory that is loadable into and unloadable from a slot connected to the R/W 50.

Operations performed in the image pickup apparatus 100 will now be described.

In a state where the image pickup apparatus 100 stands by for shooting, under the control by the CPU 60, an image signal that has been picked up by the camera block 10 is output to the LCD 40 via the camera-signal-processing section 20 and is displayed as a camera-through image. When an instruction input signal for zooming is input from the input unit 70, the CPU 60 outputs a control signal to the lens-drive control section 80, and relevant lens elements in the zoom lens 11 are moved in accordance with the control operation by the lens-drive control section 80.

When a shutter (not shown) included in the camera block 10 is operated in response to the instruction input signal from the input unit 70, the picked-up image signal is output from the camera-signal-processing section 20 to the image-processing section 30, in which the image signal is compressed and encoded and is converted into digital data in a specific data format. The converted data is output to the R/W 50 and is written on the memory card 1000.

Focusing is performed when, for example, the shutter release button of the input unit 70 is pressed down halfway or is pressed down all the way for recording (shooting). In the focusing operation, the lens-drive control section 80 moves relevant lens elements of the zoom lens 11 in accordance with the control signal from the CPU 60.

Image data recorded in the memory card 1000 is reproduced as follows. The R/W 50 reads desired image data from the memory card 1000 in response to an operation performed on the input unit 70. Subsequently, the image-processing section 30 performs decompression and decoding of the image data. Subsequently, a reproduced image signal is output to the LCD 40, whereby a reproduced image is displayed on the LCD 40.

While the above exemplary embodiment concerns a case where the image pickup apparatus is applied to a digital still camera, the application of the image pickup apparatus is not limited thereto. The image pickup apparatus may also be applied to a wide variety of other apparatuses, for example, digital video cameras, camera units included in digital input/output apparatuses such as camera-equipped mobile phones and camera-equipped personal digital assistants (PDAs), and the like.

The shapes and values of the individual elements indicated in the embodiments described above are only exemplary shapes and values for carrying out the present invention, and shall not be interpreted as limiting the technical scope of the present invention.

The present application contains subject matter related to that disclosed in Japanese Priority Patent Application JP 2009-028517 filed in the Japan Patent Office on Feb. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in order from an object side to an image side:
   a first lens unit having a positive refractive power and whose position is fixed;
   a second lens unit having a negative refractive power and being movable mainly for zooming;
   a third lens unit having a positive refractive power and whose position is fixed;
   a fourth lens unit having a positive refractive power and being movable for correction of a focal position and for focusing performed in response to zooming; and
   a fifth lens unit having a positive refractive power,
   wherein the fifth lens unit includes, in order from the object side to the image side,
      a fixed sub-unit having a negative refractive power and whose position is fixed; and
      a movable sub-unit having a positive refractive power and being movable in a direction substantially perpendicular to an optical axis,
   wherein an image formed on an image surface is movable in a direction substantially perpendicular to the optical axis by moving the movable sub-unit of the fifth lens unit in the direction substantially perpendicular to the optical axis,
   wherein an aperture stop is provided on the object side of the third lens unit, and
   wherein the third lens unit includes
      a positive sub-unit having a positive refractive power; and
      a negative sub-unit having a negative refractive power
   wherein the third lens unit satisfies the following conditional expressions:

$$0.4 < |f31/f32| < 0.6$$

$$0.3 < fw/f31 < 0.5$$

where f31 denotes a focal length of the positive sub-unit included in the third lens unit, f32 denotes a focal length of the negative sub-unit included in the third lens unit, and fw denotes an overall focal length of the zoom lens at a wide-angle end.

2. The zoom lens according to claim 1, wherein the negative sub-unit of the third lens unit includes a positive refractive lens element and a negative refractive lens element that are cemented together.

3. The zoom lens according to claim 2, wherein the negative sub-unit of the third lens unit satisfies the following conditional expressions:

$$0.3 < |f32f/f32s| < 0.6$$

$$0.6 < f3/f32s < 0.8$$

where f32f denotes a focal length of the negative refractive lens element included in the negative sub-unit of the third lens unit, f32s denotes a focal length of the positive refractive lens element included in the negative sub-unit of the third lens unit, and f3 denotes a focal length of the third lens unit.

4. An image pickup apparatus comprising:
   a zoom lens; and
   an image pickup device converting an optical image formed by the zoom lens into an electrical signal,
   wherein the zoom lens includes, in order from an object side to an image side,
      a first lens unit having a positive refractive power and whose position is fixed;
      a second lens unit having a negative refractive power and being movable mainly for zooming;
      a third lens unit, having a positive refractive power and whose position is fixed;
      a fourth lens unit having a positive refractive power and being movable for correction of a focal position and for focusing performed in response to zooming; and
      a fifth lens unit having a positive refractive power,
   wherein the fifth lens unit includes, in order from the object side to the image side,
      a fixed sub-unit having a negative refractive power and whose position is fixed; and a movable sub-unit having a positive refractive power and being movable in a direction substantially perpendicular to an optical axis, wherein an image formed on an image surface is movable in a direction substantially perpendicular to the optical axis by moving the movable sub-unit of the fifth lens unit in the direction substantially perpendicular to the optical axis, wherein an aperture stop is provided on the object side of the third lens unit, and wherein the third lens unit includes
a positive sub-unit having a positive refractive power; and
a negative sub-unit having a negative refractive power, wherein the third lens unit satisfies the following conditional expressions:

$$0.4 < |f31/f32| < 0.6$$

$$0.3 < fw/f31 < 0.5$$

where f31 denotes a focal length of the positive sub-unit included in the third lens unit, f32 denotes a focal length of the negative sub-unit included in the third lens unit, and fw denotes an overall focal length of the zoom lens at a wide-angle end.

5. The image pickup apparatus according to claim 4, wherein the negative sub-unit of the third lens unit includes a positive refractive lens element and a negative refractive lens element that are cemented together.

6. The image pickup apparatus according to claim 5, wherein the negative sub-unit of the third lens unit satisfies the following conditional expressions:

$$0.3 < |f32f/f32s| < 0.6$$

$$0.6 < f3/f32s < 0.8$$

where f32f denotes a focal length of the negative refractive lens element included in the negative sub-unit of the third lens unit, f32s denotes a focal length of the positive refractive lens element included in the negative sub-unit of the third lens unit, and f3 denotes a focal length of the third lens unit.

* * * * *